(12) United States Patent
Williams

(10) Patent No.: US 9,161,644 B2
(45) Date of Patent: Oct. 20, 2015

(54) HORIZONTAL PLATFORM AND ADVERTISEMENT DISPLAY APPARATUS AND METHOD OF USING SAME

(75) Inventor: Matthew F. Williams, Kingston, PA (US)

(73) Assignee: Drinkholder, LLC, Wilkes-Barre, PA (US)

( * ) Notice: Subject to any disclaimer, the term of this patent is extended or adjusted under 35 U.S.C. 154(b) by 146 days.

(21) Appl. No.: 13/490,006

(22) Filed: Jun. 6, 2012

(65) Prior Publication Data
US 2012/0314353 A1 Dec. 13, 2012

Related U.S. Application Data

(60) Provisional application No. 61/457,805, filed on Jun. 7, 2011, provisional application No. 61/611,946, filed on Mar. 16, 2012.

(51) Int. Cl.
| | |
|---|---|
| *G09F 3/18* | (2006.01) |
| *A47G 23/02* | (2006.01) |
| *G09F 23/00* | (2006.01) |
| *G09F 7/18* | (2006.01) |

(52) U.S. Cl.
CPC .............. *A47G 23/0208* (2013.01); *G09F 7/18* (2013.01); *G09F 23/00* (2013.01)

(58) Field of Classification Search
CPC .......... A47B 11/00; A47B 17/00; A47G 1/02; A47G 1/06; A47G 1/0606
USPC ............ 40/727, 611.06, 611.05, 488, 611.07; 108/42, 152, 108; D6/568, 567
See application file for complete search history.

(56) References Cited

U.S. PATENT DOCUMENTS

| | | | | |
|---|---|---|---|---|
| 259,751 | A * | 6/1882 | Downes et al. | 40/727 |
| 398,953 | A * | 3/1889 | East | 40/727 |
| 3,908,563 | A | 9/1975 | Eckart | |
| 4,343,405 | A | 8/1982 | Virte et al. | |
| 4,467,543 | A * | 8/1984 | Townsend | 40/624 |
| 5,437,116 | A | 8/1995 | Hardy | |
| 5,924,367 | A | 7/1999 | Henke et al. | |
| 6,059,128 | A | 5/2000 | Wang | |
| 6,209,248 | B1 | 4/2001 | Reinhard | |
| 6,467,210 | B1 * | 10/2002 | Chang | 40/792 |
| 7,090,085 | B1 | 8/2006 | Vicendese et al. | |

(Continued)

FOREIGN PATENT DOCUMENTS

| | | |
|---|---|---|
| FR | 2745108 A1 | 8/1997 |
| JP | 2006098442 A | 4/2006 |
| WO | WO2004112550 A1 | 12/2004 |

*Primary Examiner* — Casandra Davis
(74) *Attorney, Agent, or Firm* — Roylance, Abrams, Berdo & Goodman, L.L.P.

(57) ABSTRACT

A unique beverage holder is adapted to be mounted on a vertical wall surface, and includes a cantilevered beverage holder platform and an advertising display, preferably including a slot or other arrangement for receiving an advertising media and an outwardly facing window for viewing the advertisement. The device is preferably installed in bathrooms, and the like, such as above urinals to provide bathroom users with a place to set their beverage, and at the same time attracting attention to the advertisement while the user is captive. In one embodiment, the beverage holder is adapted to be reversibly mounted on a wall bracket such that the shelf unit may alternately be at the top or bottom of the device. The reversible beverage holder is preferably secured to the wall bracket by release tabs.

10 Claims, 45 Drawing Sheets

(56) References Cited

U.S. PATENT DOCUMENTS

| | | |
|---|---|---|
| 7,156,353 B2 | 1/2007 | Kringel et al. |
| 2003/0115096 A1 | 6/2003 | Reynolds et al. |
| 2004/0149765 A1 | 8/2004 | Pryce |
| 2005/0262744 A1* | 12/2005 | Tollis ........................ 40/611.07 |
| 2006/0231717 A1 | 10/2006 | Coren |
| 2007/0251905 A1 | 11/2007 | Trotta |
| 2010/0044324 A1 | 2/2010 | Gerace |
| 2010/0096346 A1 | 4/2010 | Heim |

* cited by examiner

HORIZONTAL PLATFORM AND ADVERTISEMENT DISPLAY APPARATUS AND METHOD OF USING SAME

The present application claims the benefit under 35 U.S.C. §119(e) of U.S. Provisional Application No. 61/457,805, filed Jun. 7, 2011, and U.S. Provisional Application No. 61/611,956, filed Mar. 16, 2012, the entire contents of both of which are hereby incorporated by reference.

FIELD OF THE INVENTION

The present invention relates to advertising display devices. In particular, the present invention relates to a beverage holder adapted to be mounted on a vertical surface and to display an advertisement, and a method of using the same.

BACKGROUND OF THE INVENTION

Throughout the hospitality industry, observations have shown that nearly two-thirds of all restroom users bring a beverage into the restroom. Examples of venues in which people bring beverages into the restroom include sports stadiums and arenas, bars, restaurants, nightclubs, casinos, airports, rest areas, and many other public area that have restrooms. Men are often forced to place their beverage on top of a urinal. Women typically place their beverage on top of a toilet paper holder or the toilet in the bathroom stall. This situation is unsanitary and also wastes an opportunity to deliver advertising to a captive audience. Accordingly there is a need for a beverage holder that can be mounted onto a vertical surface in places such as restrooms, and in particular above urinals or in restroom stalls, and which also displays advertisements while providing a convenient location for a user to place their beverage while they are using the restroom, or the like. Tampering and vandalism can pose a challenge for advertisers utilizing a beverage holder mounted to a wall surface. Accordingly, there is an additional need for a horizontal platform for holding beverages and the like that is designed to discourage and/or minimize tampering and vandalism associated with the device.

SUMMARY OF THE INVENTION

The above disadvantages are overcome and other advantages are realized by providing a horizontal platform for holding beverages and the like adapted to be mounted on a vertical surface in combination with an advertising display preferably mounted above or below the beverage holding surface. The device additionally preferably includes features that eliminate or discourage tampering and vandalism.

BRIEF DESCRIPTION OF THE DRAWINGS

The invention will be more readily understood with reference to the embodiments thereof illustrated in the attached drawing figures, in which.

In the drawing figures, it will be understood that like numerals refer to like features and structures.

DETAILED DESCRIPTION OF THE EXEMPLARY EMBODIMENTS

Figure 1:
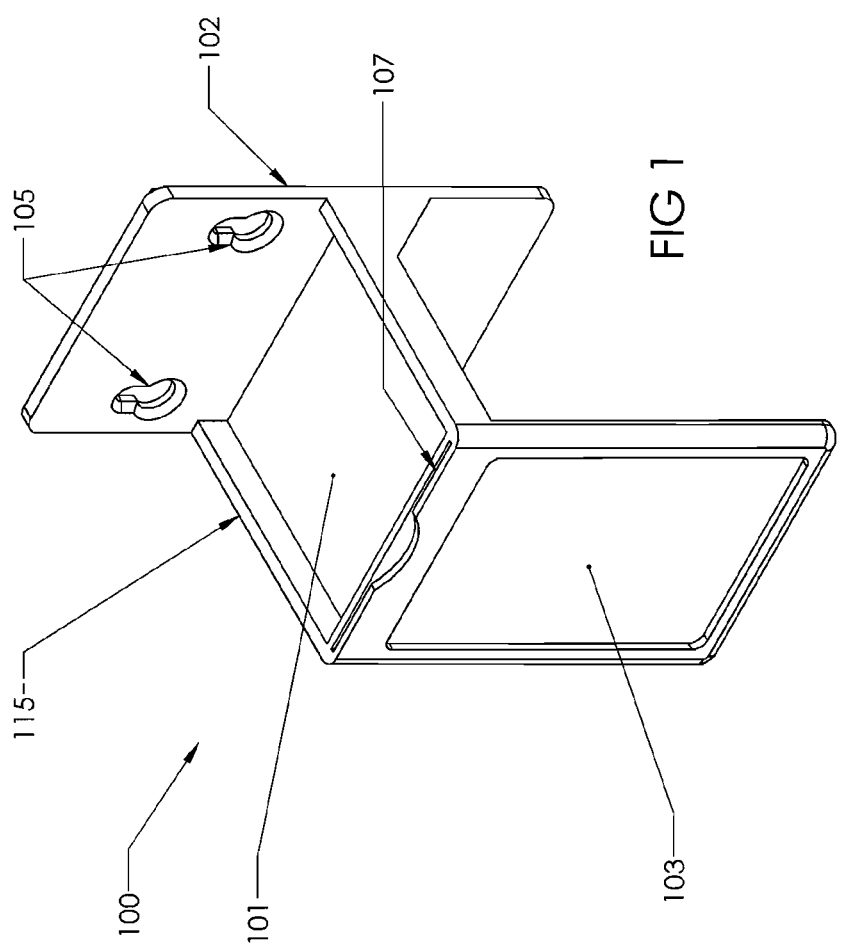
FIG. 1 is a perspective view of an exemplary embodiment of an apparatus according to the present invention.
Figure 2:
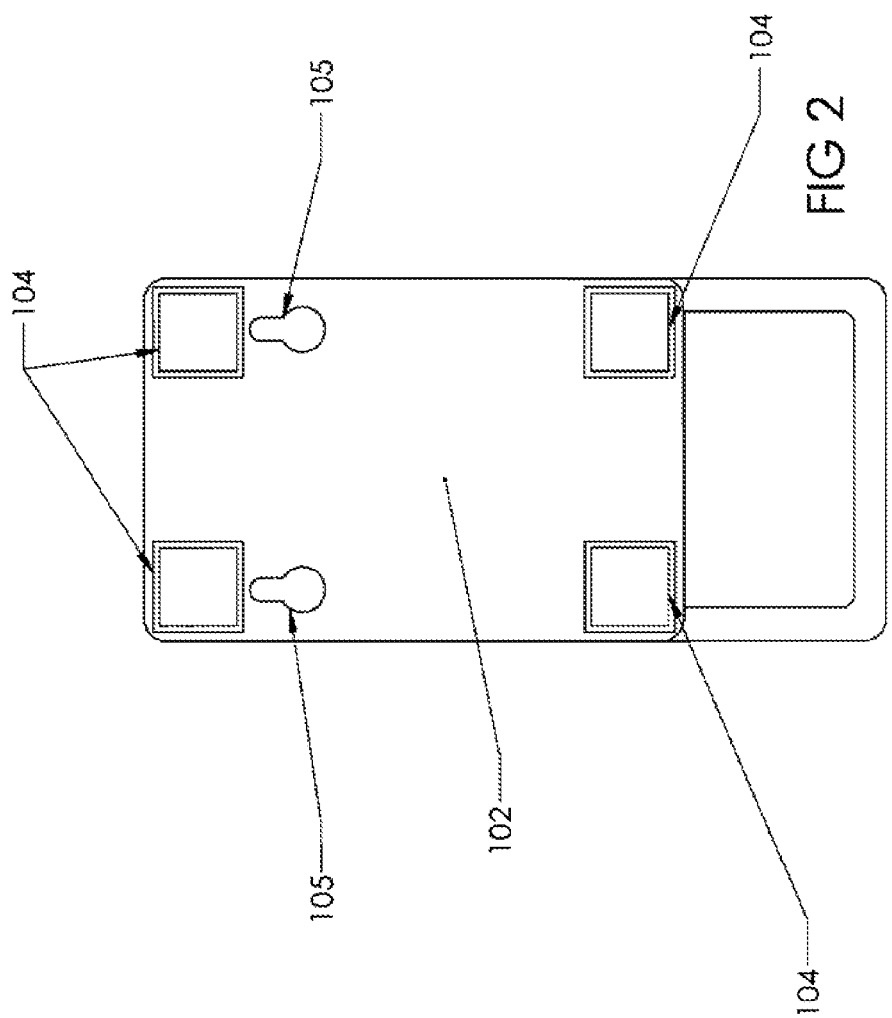
FIG. 2 is a rear elevation view of an exemplary embodiment of an apparatus according to the present invention.
Figure 3:
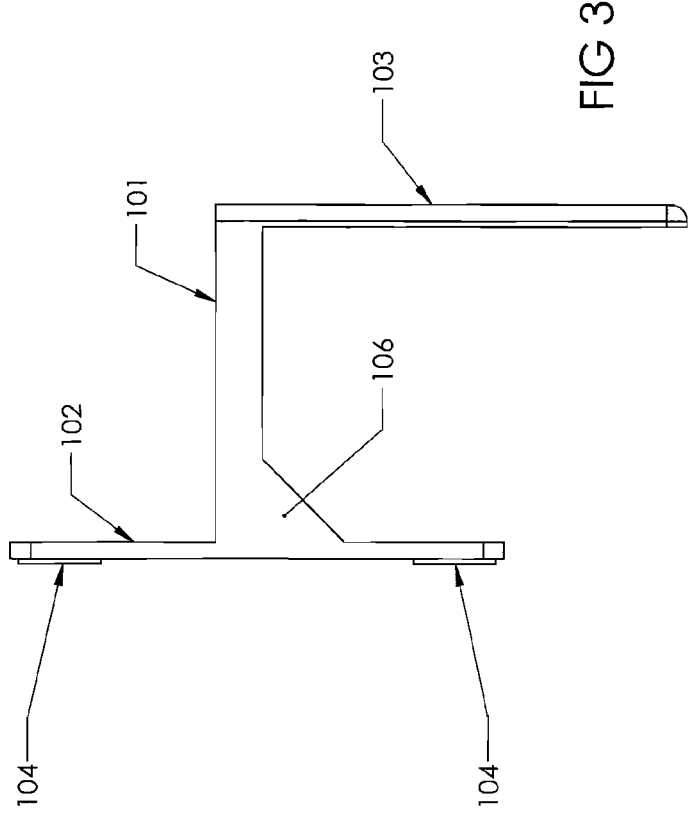
FIG. 3 is a side elevation view of an exemplary embodiment of an apparatus according to the present invention.

The exemplary embodiments of the invention will now be described with reference to the attached drawing figures. Throughout the specification the term "beverage holder" will be understood to refer to a horizontal shelf or platform with sufficient weight bearing capability to support a beverage or any other desired object. The invention is not intended to be limited to holding beverages. Rather, the term "beverage holder" is used in an exemplary manner herein. As shown in FIGS. 1-8, an apparatus 100 according to an exemplary embodiment of the present invention primarily consists of a beverage holder platform 101, a mounting portion 102, and an advertising compartment 103.

The mounting portion 102 is a substantially flat member adapted to be attached to a vertical surface such as the wall of a bathroom. The mounting portion preferably includes mounting means such as, for example, adhesive strips 104 shown in FIGS. 2-4. Adhesive strips 104, if used, are preferably of an adhesive having sufficient strength to reliably holder the device 100 onto a wall surface with a full beverage resting on the beverage holder platform 101. The adhesive is also preferably, but not necessarily, selected to release from a wall surface without causing damage to the wall surface. Other non-permanent fastening means such as suction cups, or any suitable alternative may also be used in place of adhesive strips 104. In other embodiments a more permanent adhesive may be selected and preferred to avoid the device 100 coming unstuck from the wall surface and spilling a beverage placed onto the beverage holder platform 101. The mounting means may also include fastener holes, such as holes 105, which are preferably shaped to accept a screw or bolt, or the like, so that apparatus 100 may be more permanently attached to a wall surface via screws or wall anchors, and the like.

Figure 8:
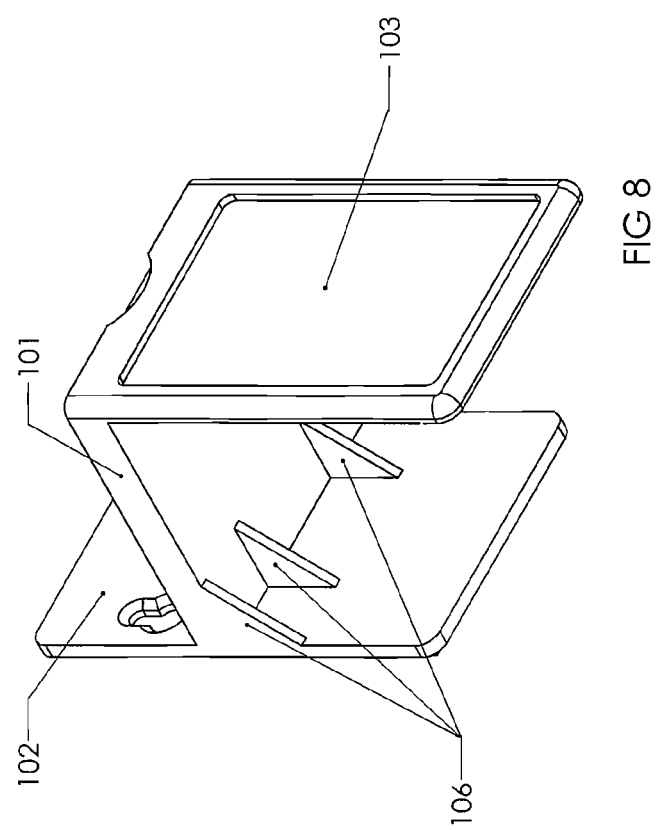
FIG. 8 is a perspective view of an exemplary embodiment of an apparatus according to the present invention.

Beverage holder platform 101 extends outwardly from mounting portion 102 in a cantilevered manner. Beverage holder platform is preferably integrally formed with mounting portion 102. As seen in FIG. 1, beverage holder platform 101 preferably includes a lip 115 which functions to keep a beverage placed on the beverage holder platform 101 from sliding off of the apparatus 100. As shown in FIG. 8, the beverage holder platform 101 is preferably provided with one or more brace members 106 to provide structural support to the beverage holder platform such that the platform 101 can support at least the weight of a full glass beverage full of liquid, and preferably considerably more in order to account for unforeseen situations such as multiple glasses being stacked onto the beverage holder platform. Bracket members 106 are preferably, but not necessarily, integrally formed with the beverage holder platform 101 and the mounting portion 102.

Figure 4:
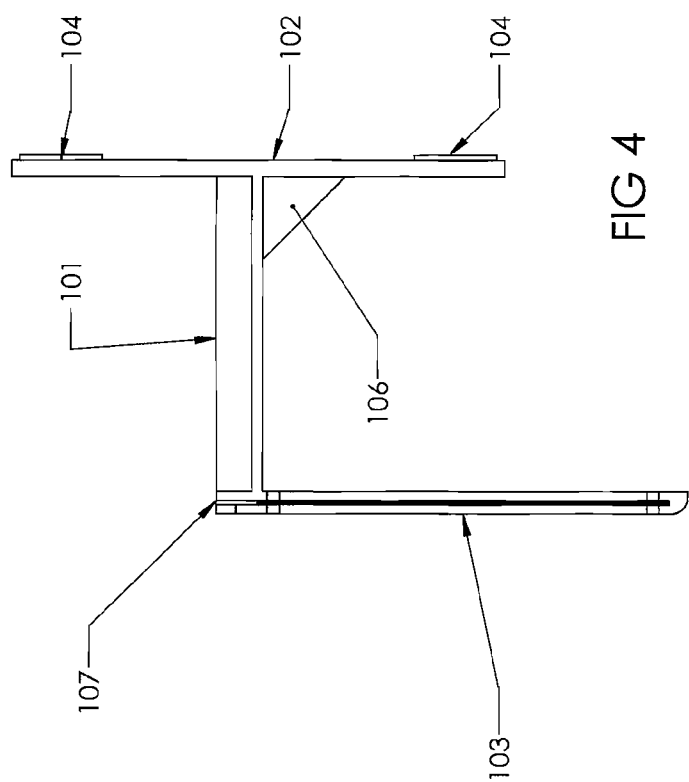
FIG. 4 is a section view along section A-A of FIG. 6.
Figure 5:
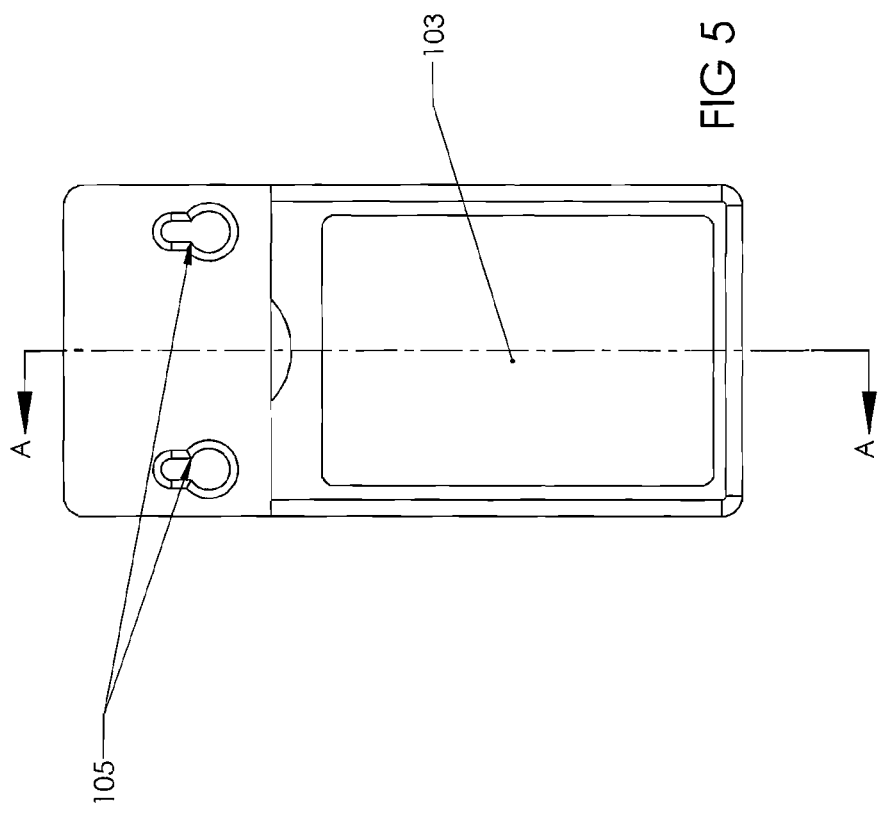
FIG. 5 is a front elevation view of an exemplary embodiment of an apparatus according to the present invention.
Figure 6:
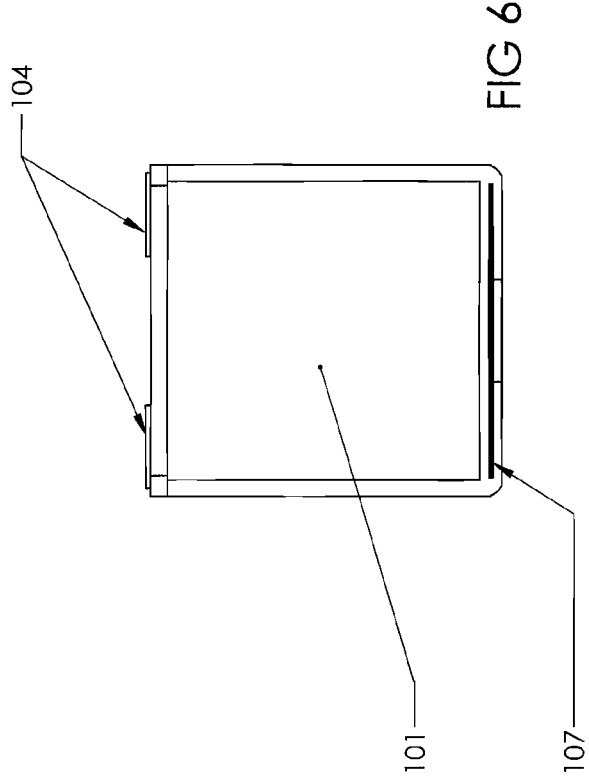
FIG. 6 is a top elevation view of an exemplary embodiment of an apparatus according to the present invention.
Figure 7:
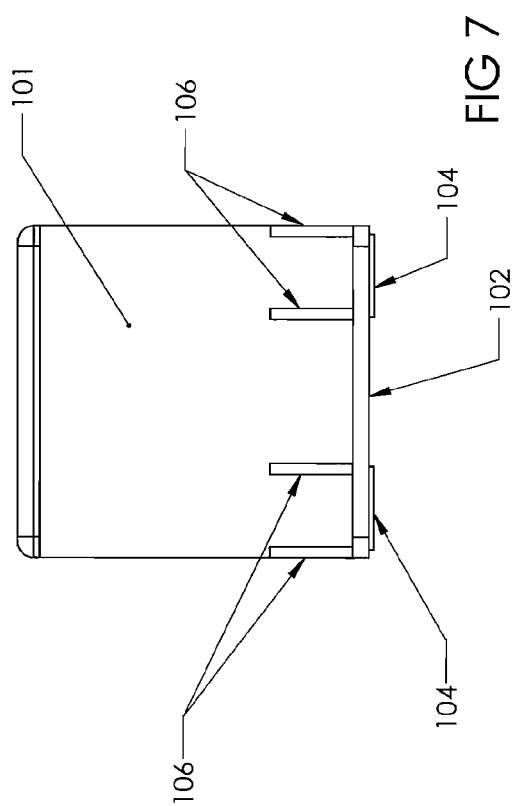
FIG. 7 is a bottom elevation view of an exemplary embodiment of an apparatus according to the present invention.

As shown in FIG. 1 an advertising compartment 103 is preferably provided on the outwardly facing edge of the beverage holder platform 101. The advertising compartment includes a slot 107 or other means by which advertising media may be inserted into the device 100. Advertising compartment also preferably includes a clear window through which the advertising media, once inserted into the advertising compartment 103, may be viewed. FIG. 4 is a section view along section A-A of FIG. 5, and shows slot 107 having advertising media inserted therein.

While exemplary embodiments of the present invention are described herein as receiving static advertisements in compartment 103, it should be understood that the present invention, and in particular all of the embodiments described herein, are not limited to static advertisements, and are readily applicable to variable display devices including digital electronic displays, and the like, in place of the compartment 103 and clear window described herein. The digital displays may include all stand-alone and networked digital displays, including looping and interactive models, and the like. The displays can be powered internally by batteries, and the like, or externally by an AC power source, and the like. Variable displays for use with embodiments of the present invention can include technological capabilities including but not limited to wireless networking, such as Wifi and Bluetooth, motion detection, photo detection, orientation detection, near field communication (NFC) sensors, and the like. The advertising compartment 103 will also preferably be designed to minimize or prevent tampering, vandalism and water damage.

Figure 9:
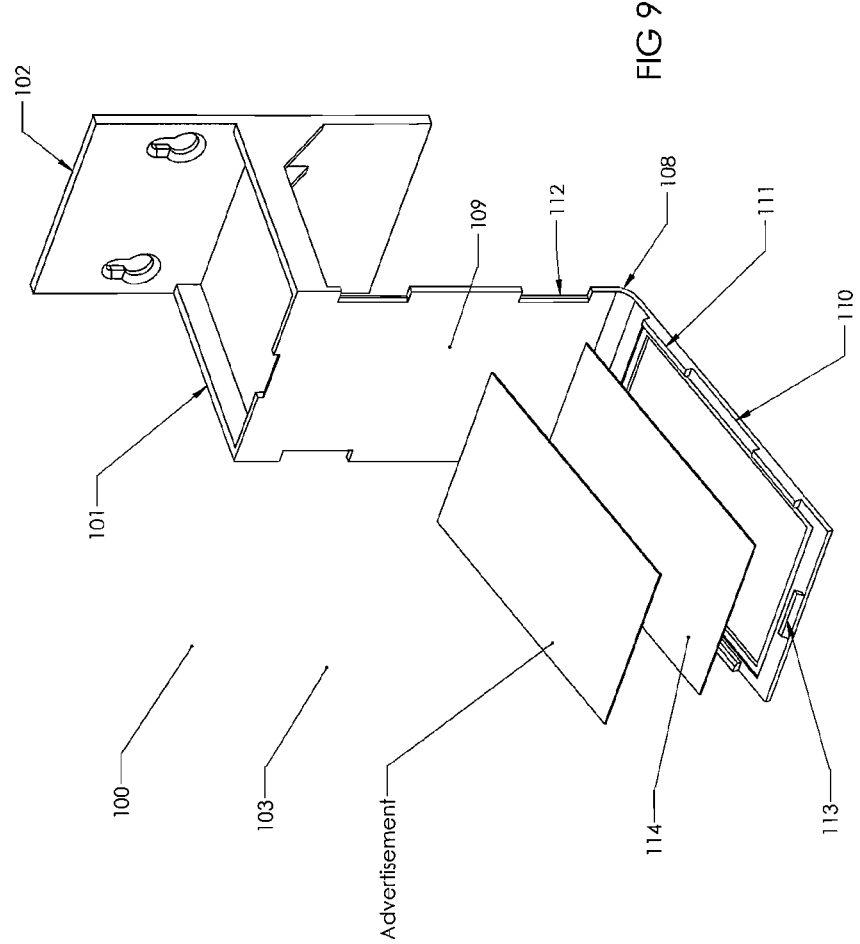
FIG. 9 is another embodiment of a device according to an exemplary embodiment of the present invention.
Figure 10:
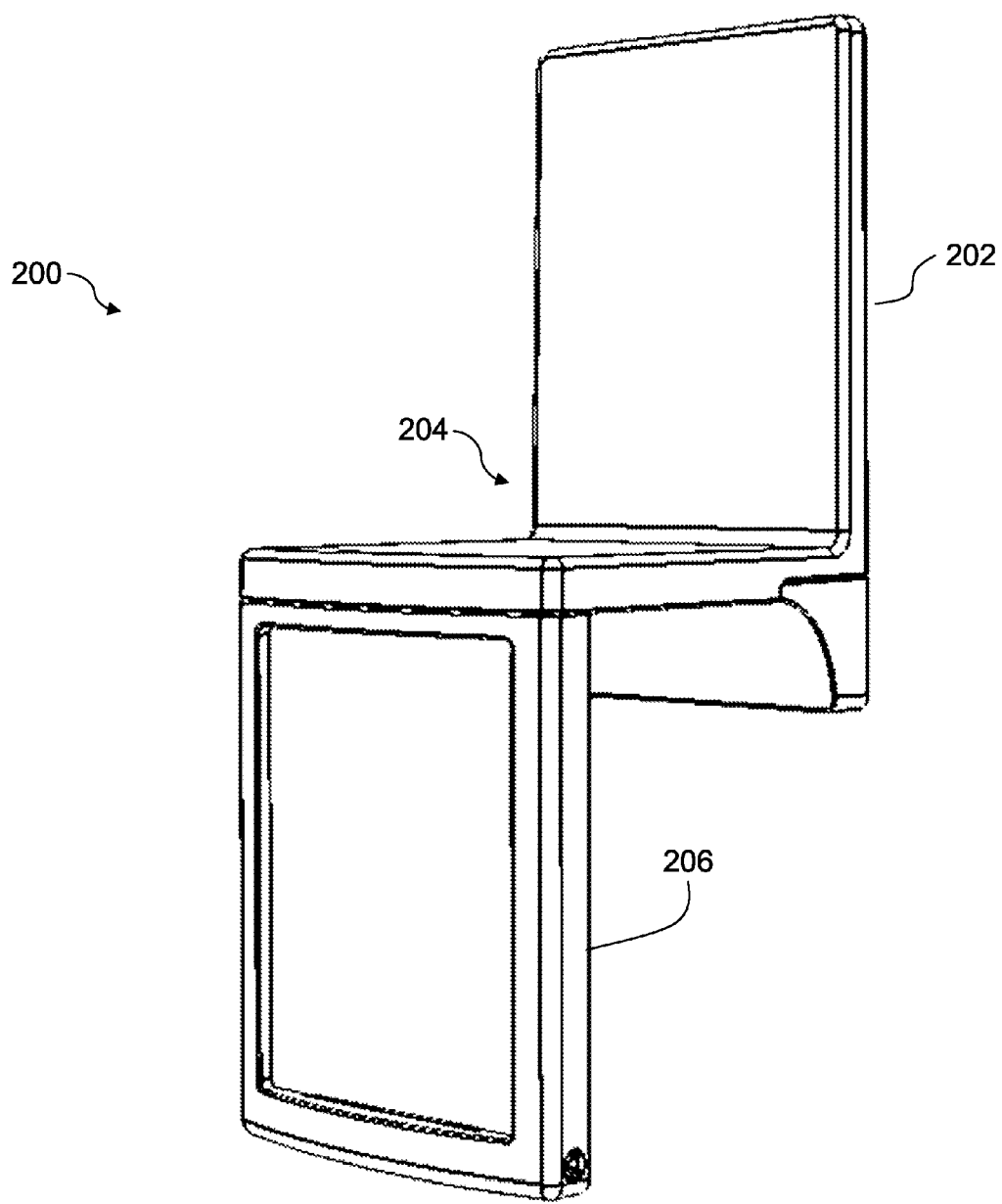
FIGS. 10-18 depict a device according to a third exemplary embodiment of the present invention.
Figure 11:
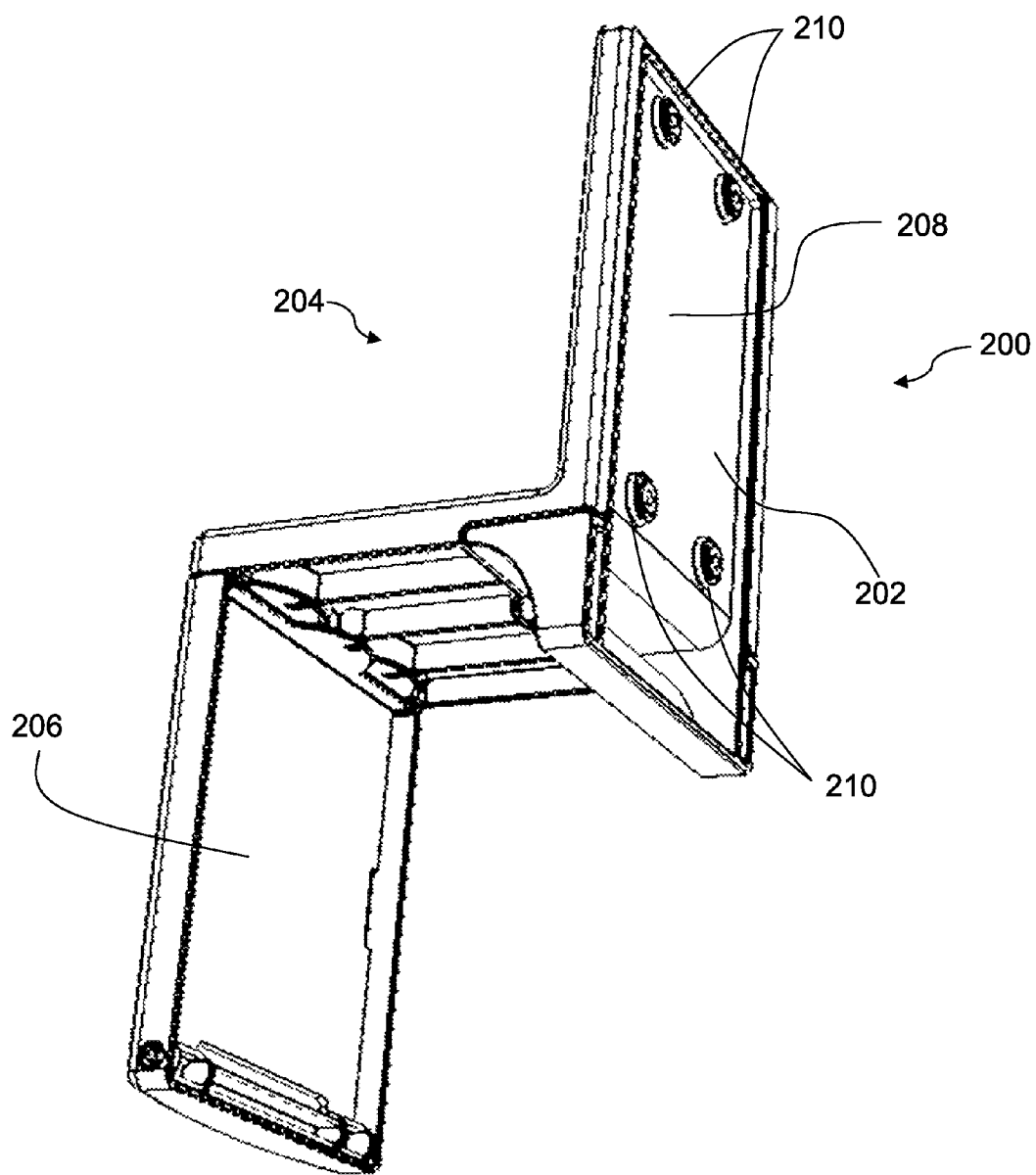

FIG. 9 illustrates another exemplary embodiment of the present invention. The embodiment of FIG. 9 is substantially similar to the embodiment previously described, except that the advertising compartment 103 is provided with a hinge 108. Providing device 100 with a hinged advertising compartment 103 may be advantageous so that device 100 may be molded as a single integral device. In such a construction, the advertising compartment comprises a compartment back 109 and a compartment front 110. One of compartment back 109 and compartment front 110 preferably includes one or more guides 111, and the other of compartment back 109 and compartment front 110 preferably includes one or more corresponding guide spaces 112 to receive the one or more guides 111. Compartment front 110 also preferably includes a securing latch 113 to securely close compartment front 110 on compartment back 109. A window 114 is also preferably provided to cover a view opening in the compartment front 110. Window 114 may preferably be sonically welded to compartment front 110. Alternately, window 114 may be joined to compartment front 110 with an adhesive. Further, window 114 may simply be set between compartment front 110 and the advertisement, as in a picture frame.

As illustrated in FIGS. 1-9, advertising compartment 103 is oriented in a substantially vertical orientation. However, it is contemplated that it may be advantageous to form advertising compartment 103 such that it is angled upwardly so that the advertisement faces a user's eye level if the device 100 is mounted below eye level.

An exemplary method of using the apparatus 100 described above will now be described. In one embodiment, advertising space is sold to advertisers in exchange for the advertisers' messages being displayed on devices 100 in bathrooms, and the like, in restaurants, bars, sports stadiums, and the like.

Another exemplary embodiment is illustrated in FIGS. 10-18. This embodiment is similar to the embodiments described above. A description of substantially similar features is omitted for brevity and clarity. The device 200 of FIGS. 10-18 is modular in design, having a mounting plate 202, a main body 204, and an advertising compartment 206. The mounting plate 202 is preferably mounted to a wall as with the embodiments described above. The main body 204 is then mounted onto the mounting plate 202. The advertising compartment 206 is removably attached to a front portion of the main body 204. Main body 204 preferably comprises a vertical portion for mounting to the mounting plate 202, and a horizontal platform extending outwardly from a wall surface.

The mounting plate 202 will now be described in greater detail. The mounting plate 202 includes a substantially flat mounting portion 208 for contacting a wall surface (not shown) onto which the device 200 is mounted. The mounting portion 208 includes fastening portions 210. The fastening portions may comprise any suitable mounting device or substance, but preferably include clearance holes for threaded fasteners, or a flat surface for adhesive strips. Mounting plate 202 also includes a lower support 212 that provides substantial vertical support to main body 204 when main body 204 is mounted onto the mounting plate 202.

Figure 12:
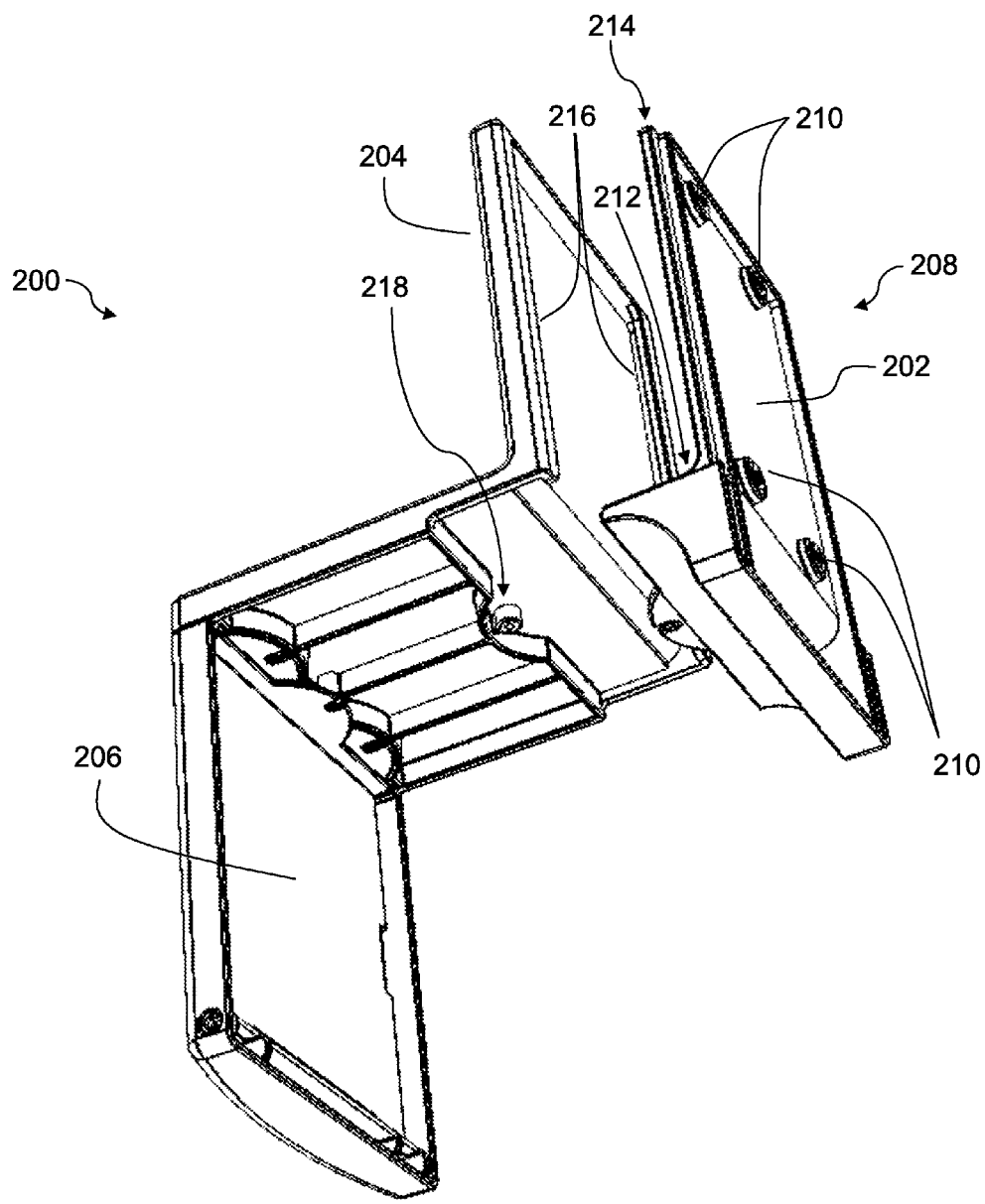
Figure 13:
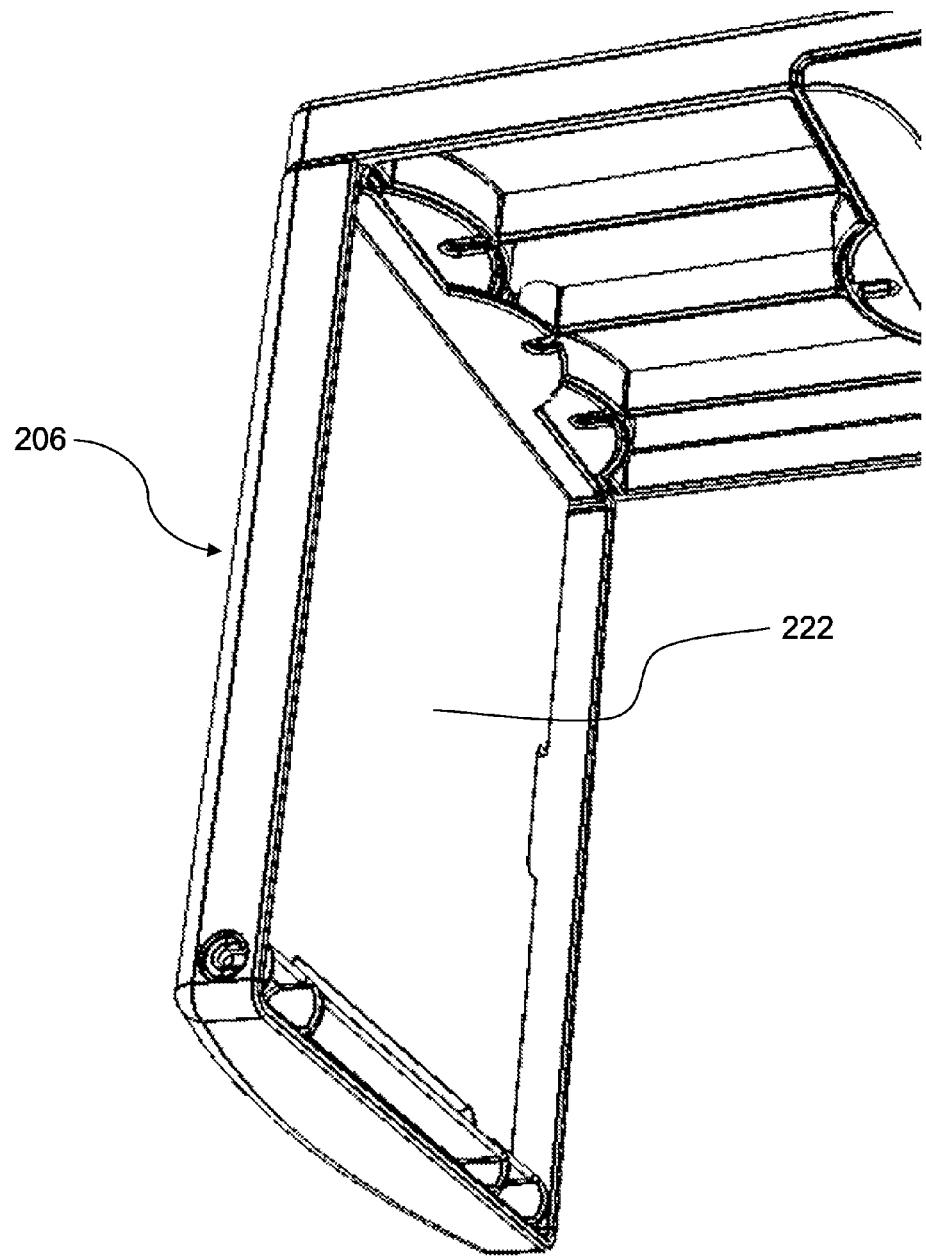
Figure 14:
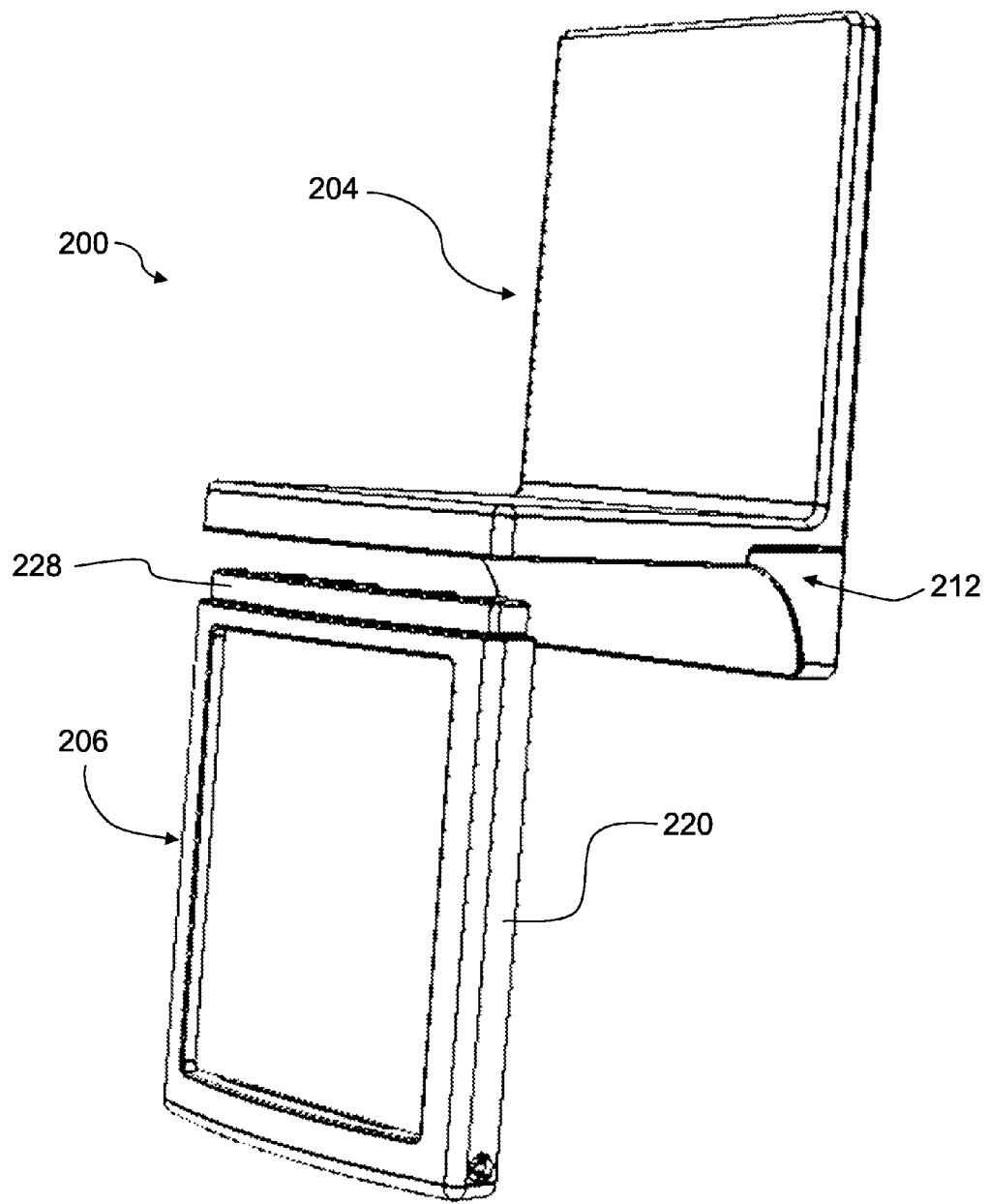
Figure 15:
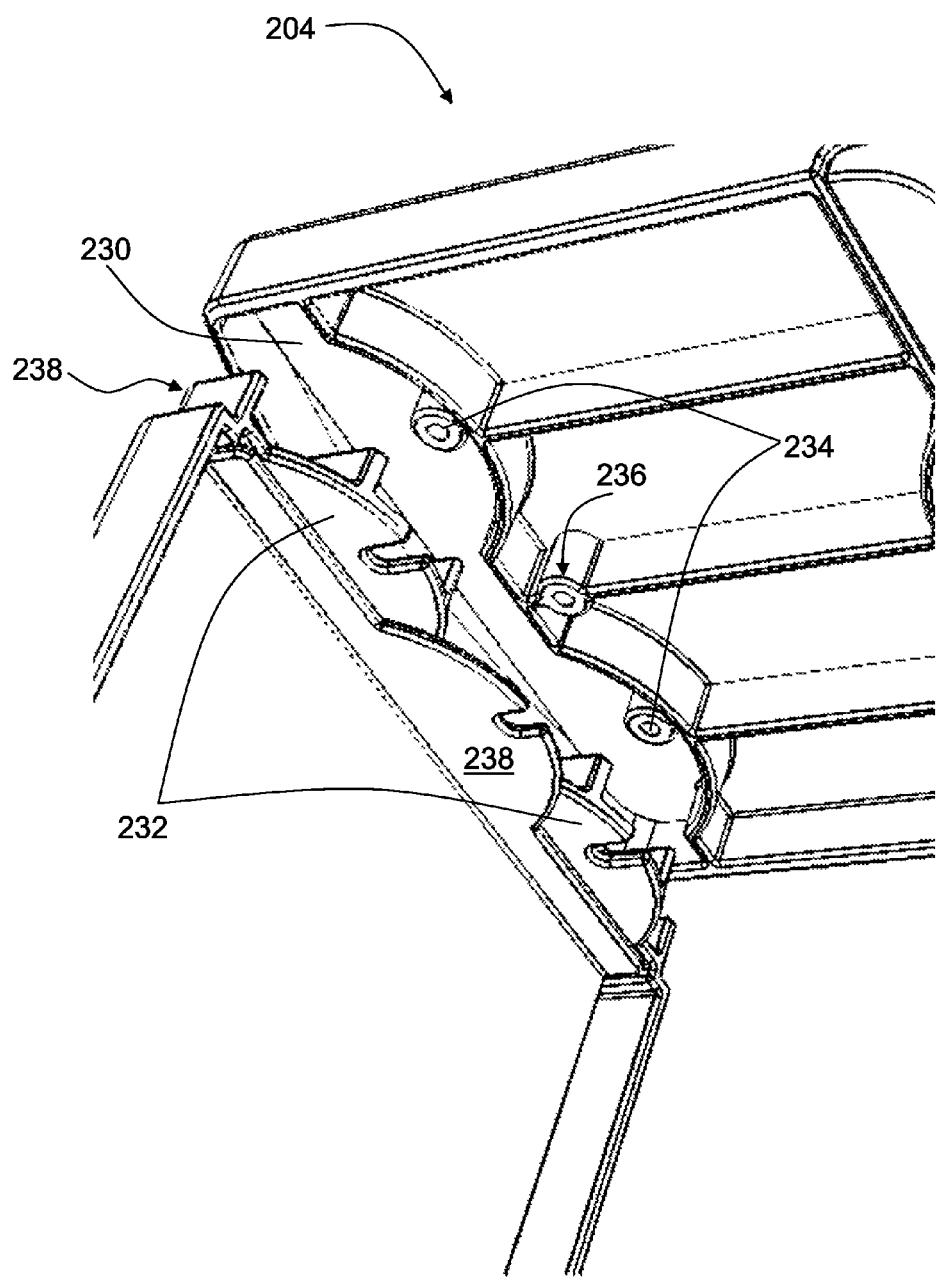
Figure 16:
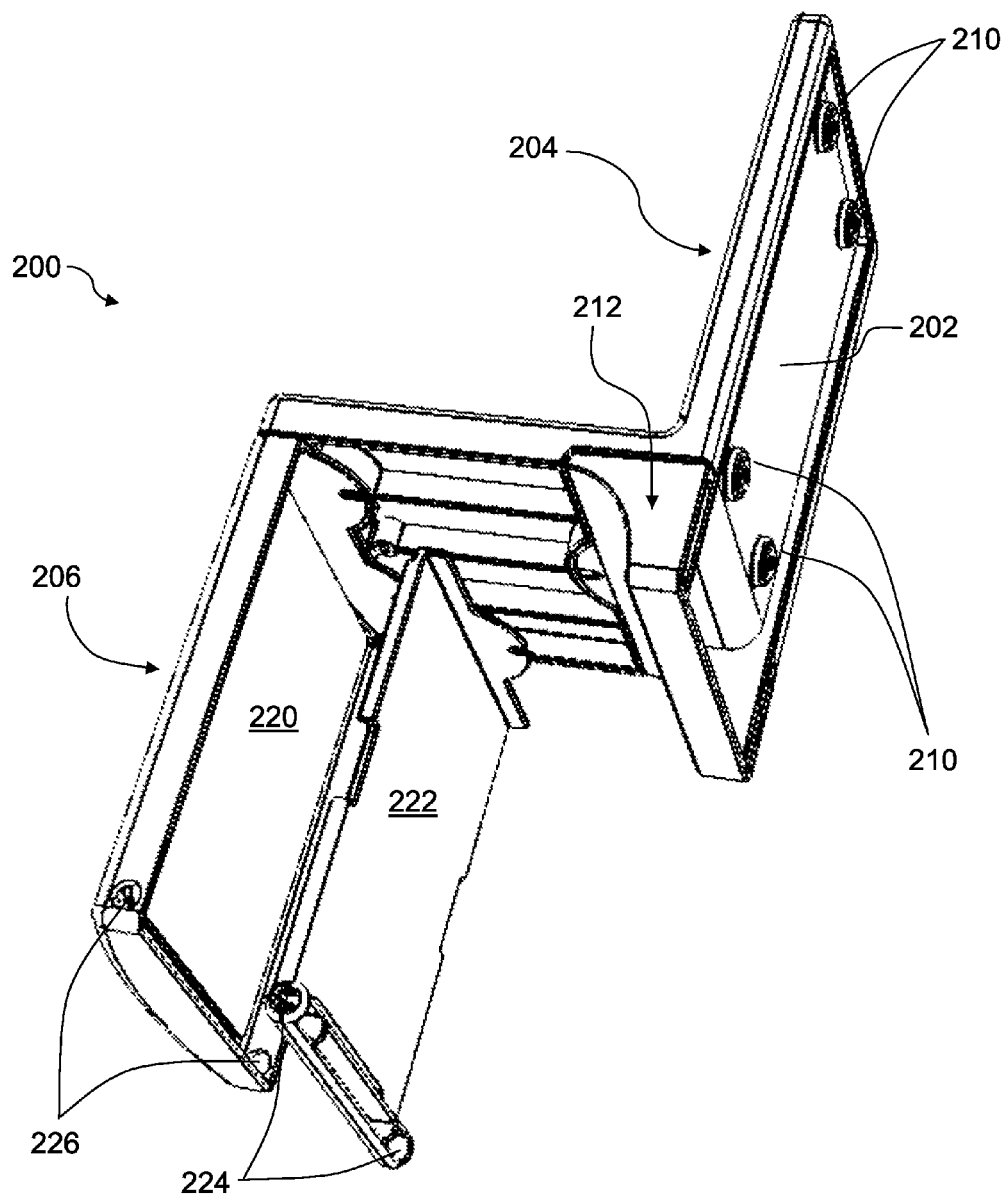
Figure 17:
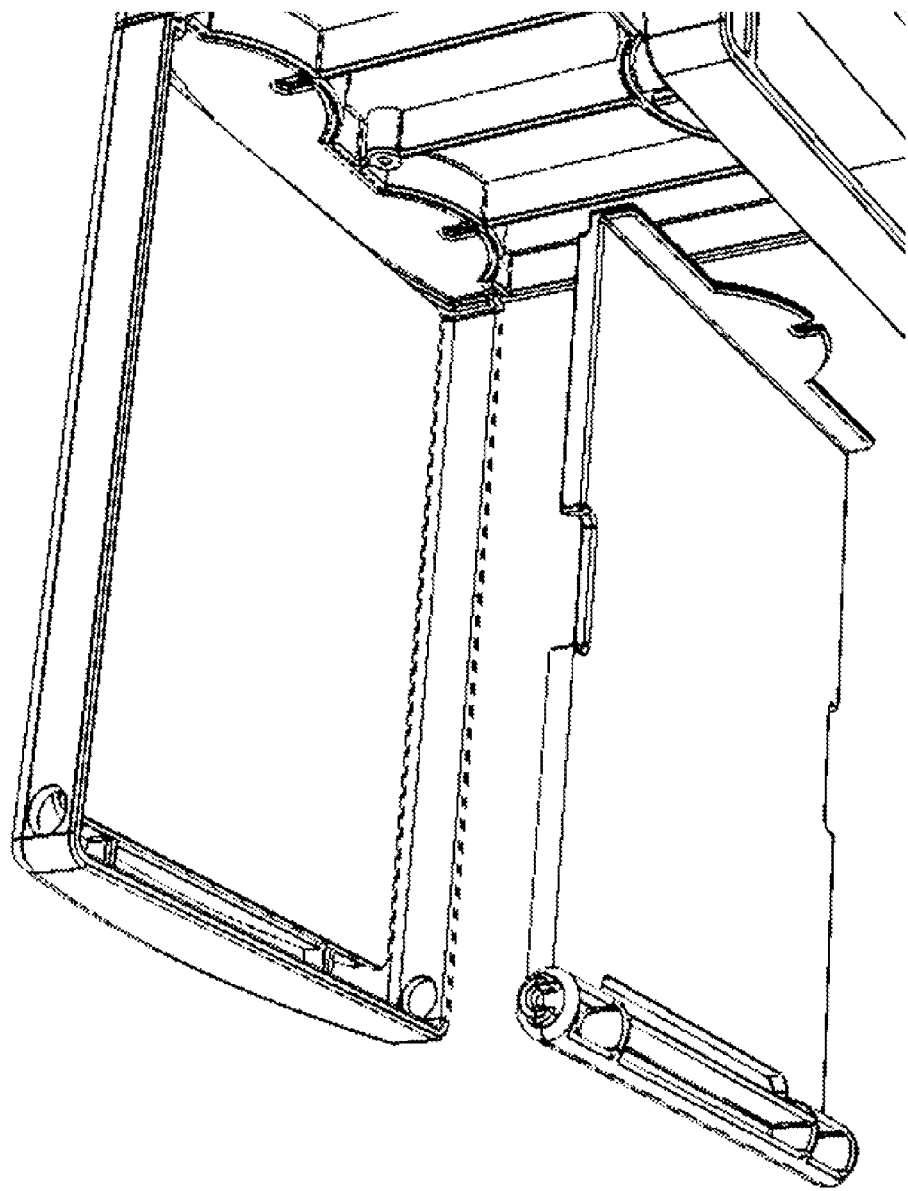
Figure 18:
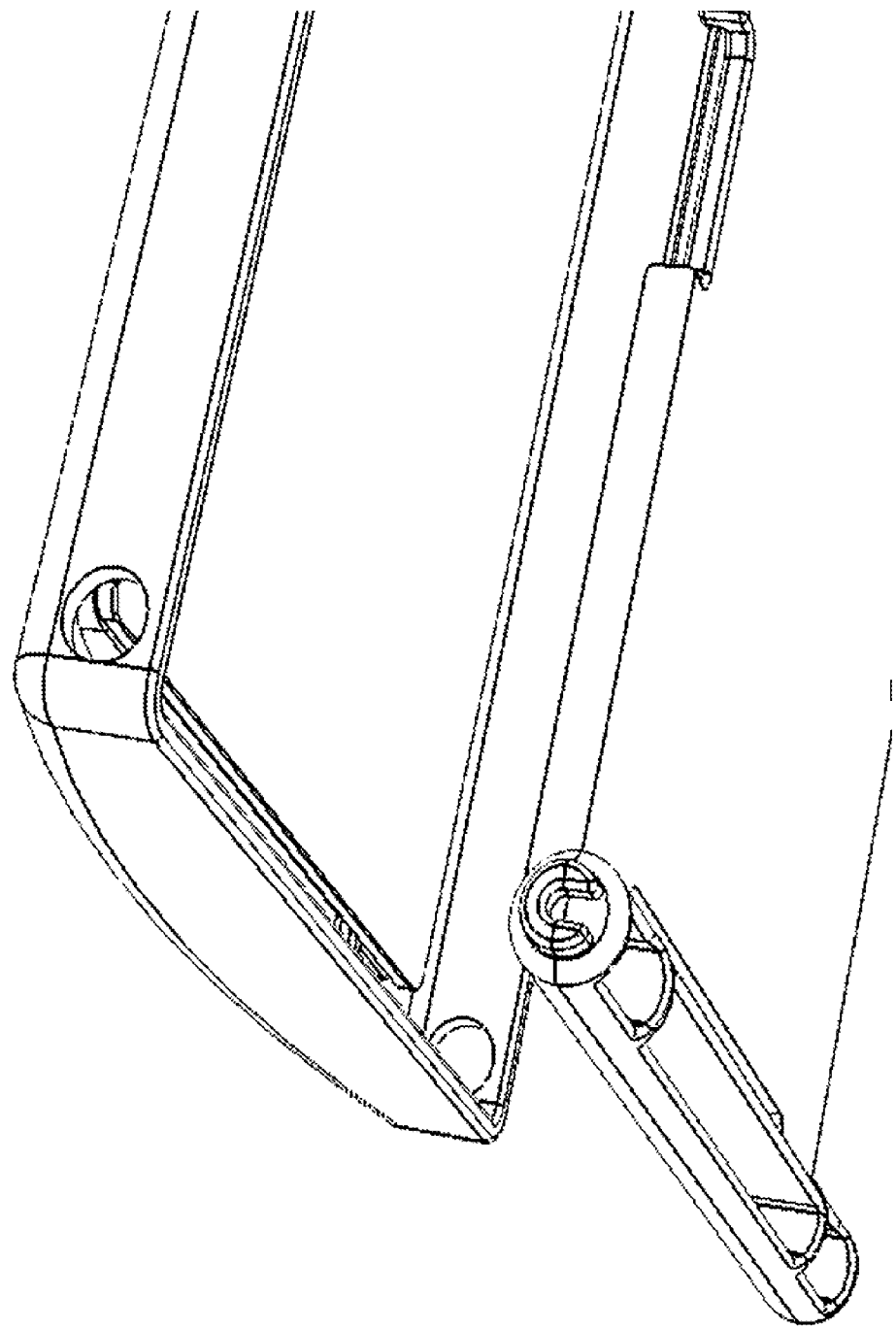
Figure 19:
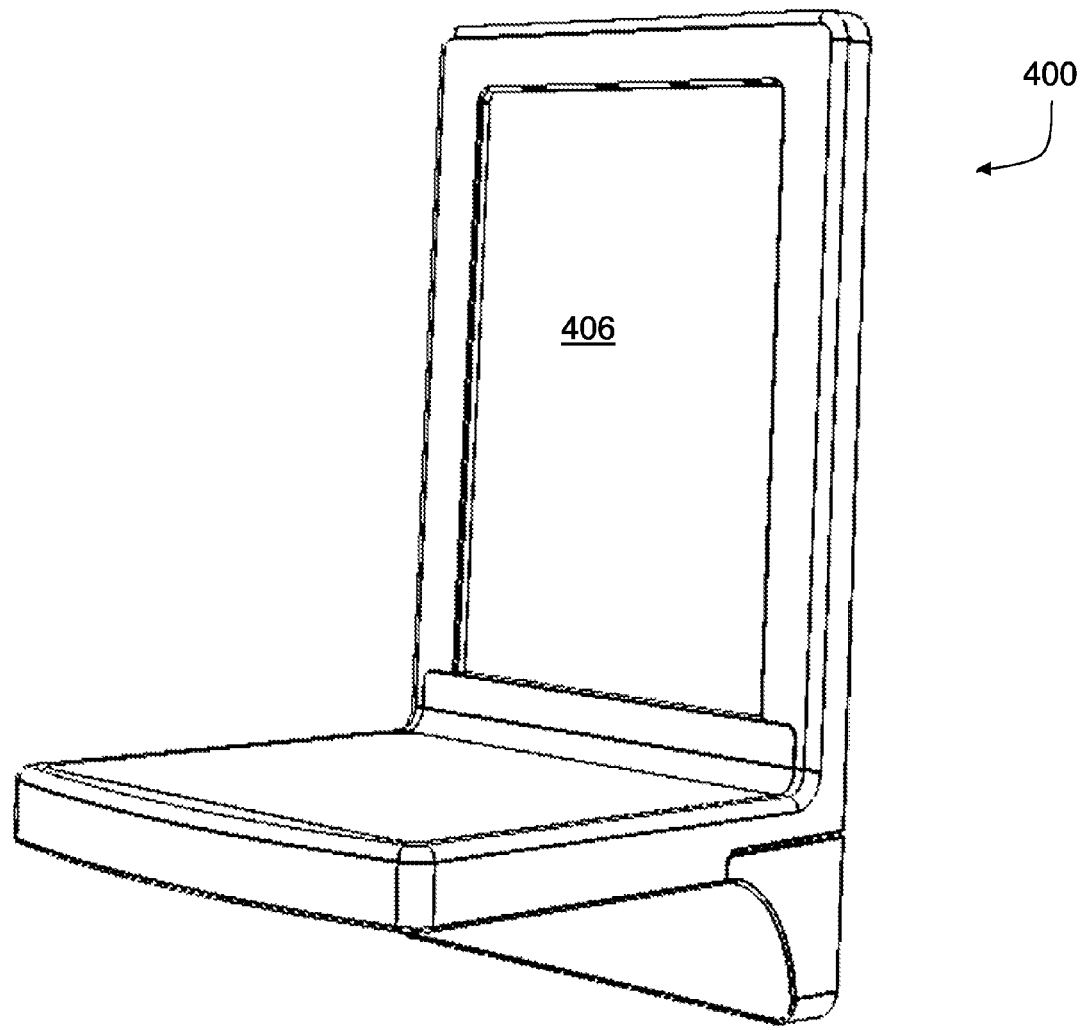
FIGS. 19-24 depict a device according to a fourth exemplary embodiment of the present invention.
Figure 20:
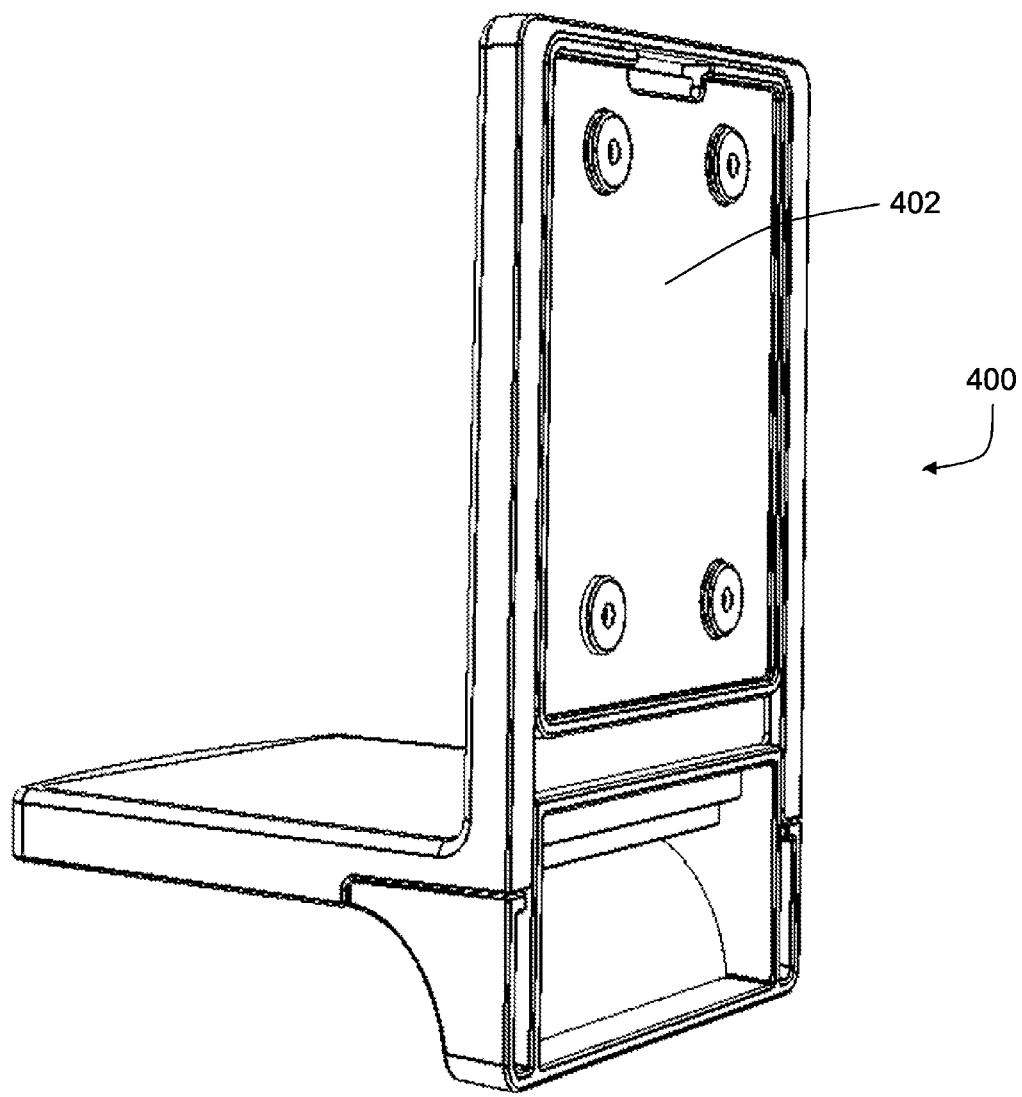
Figure 21:
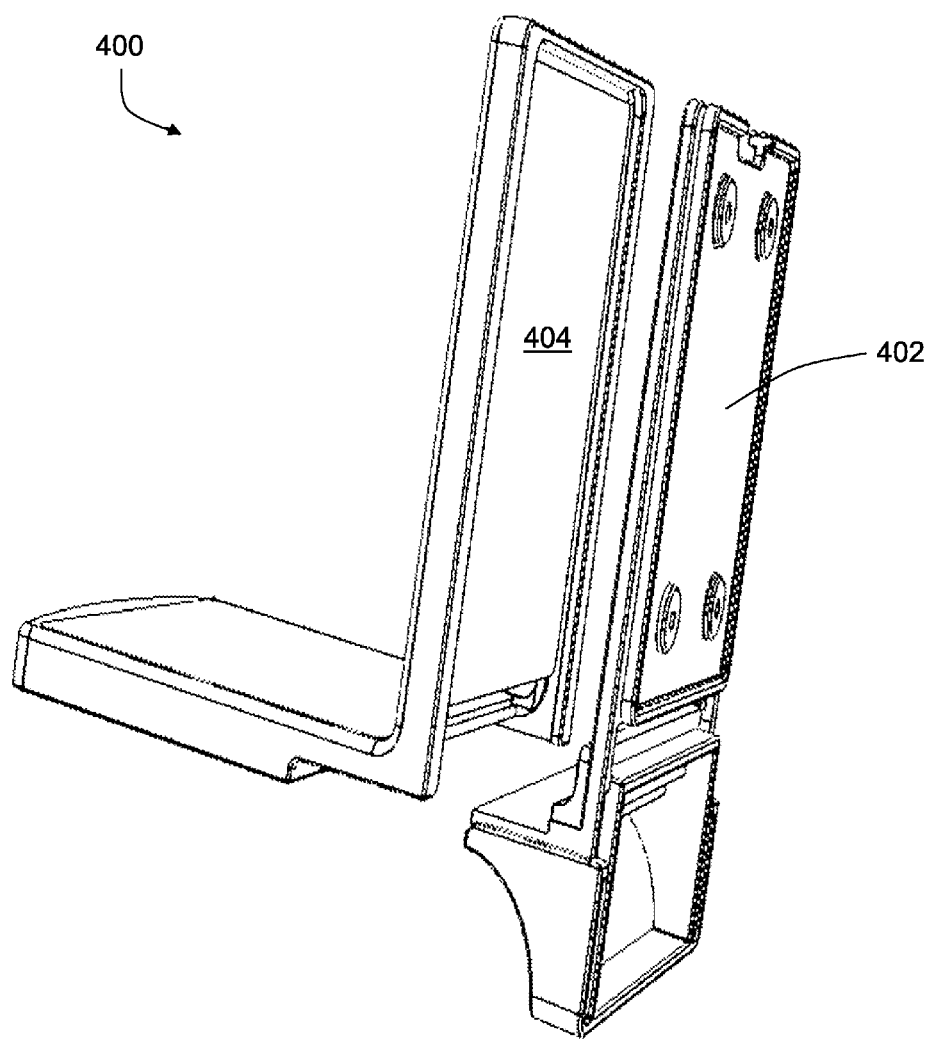
Figure 22:
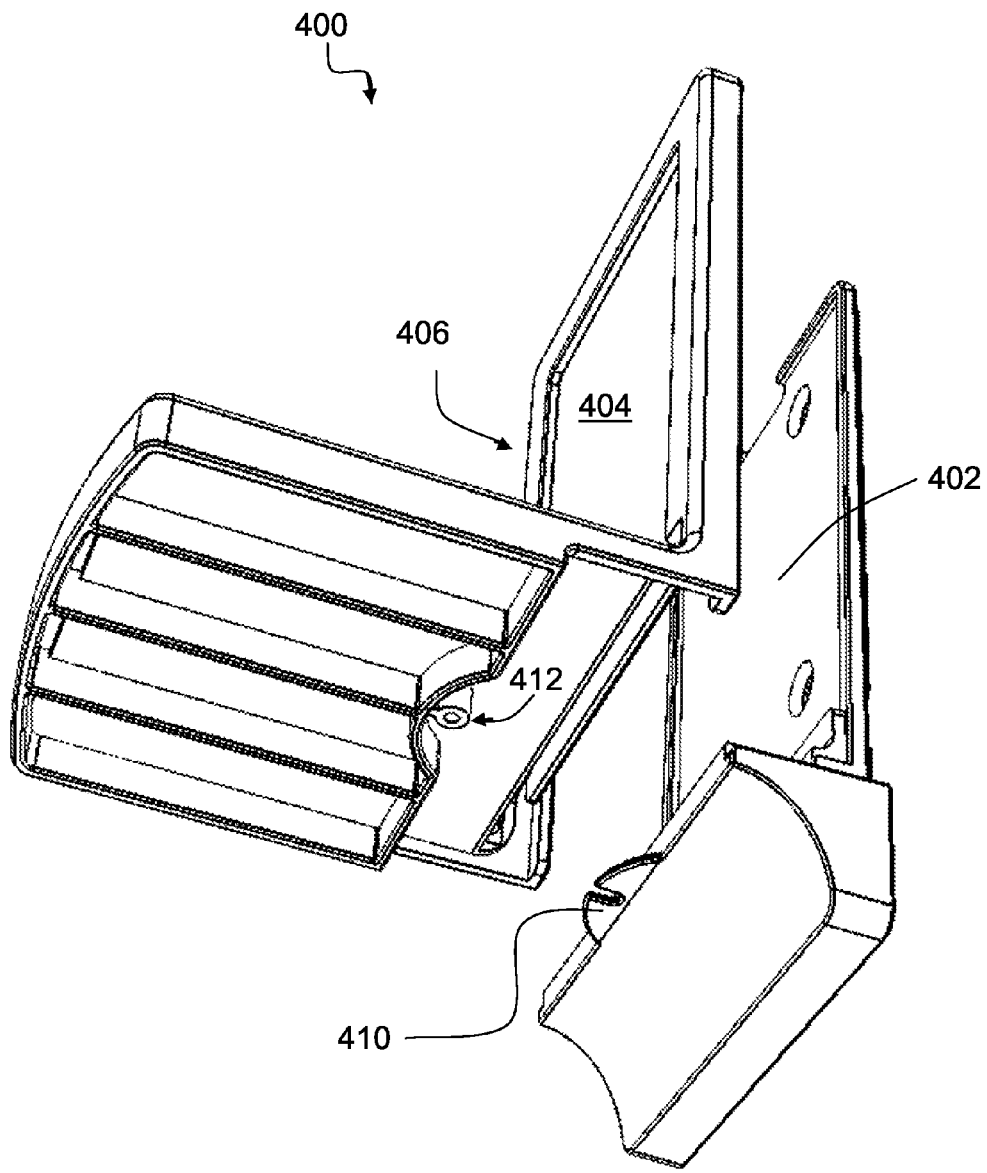
Figure 23:
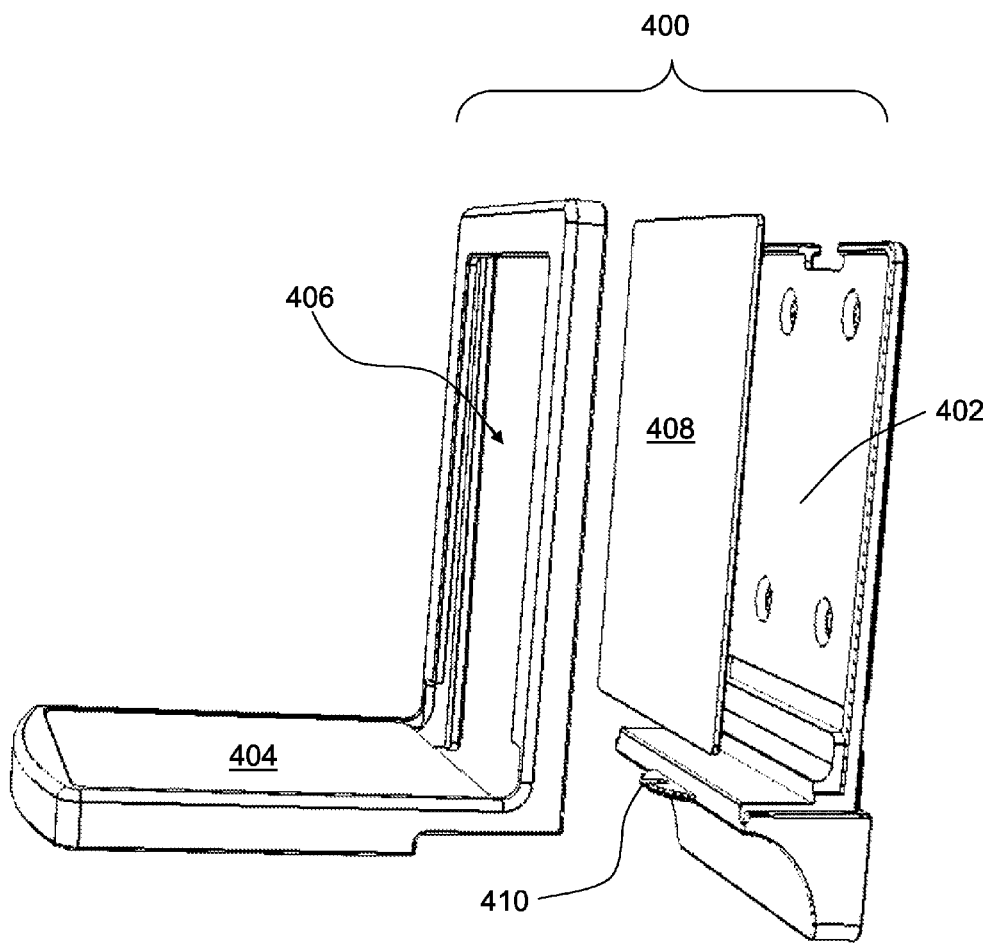
Figure 24:
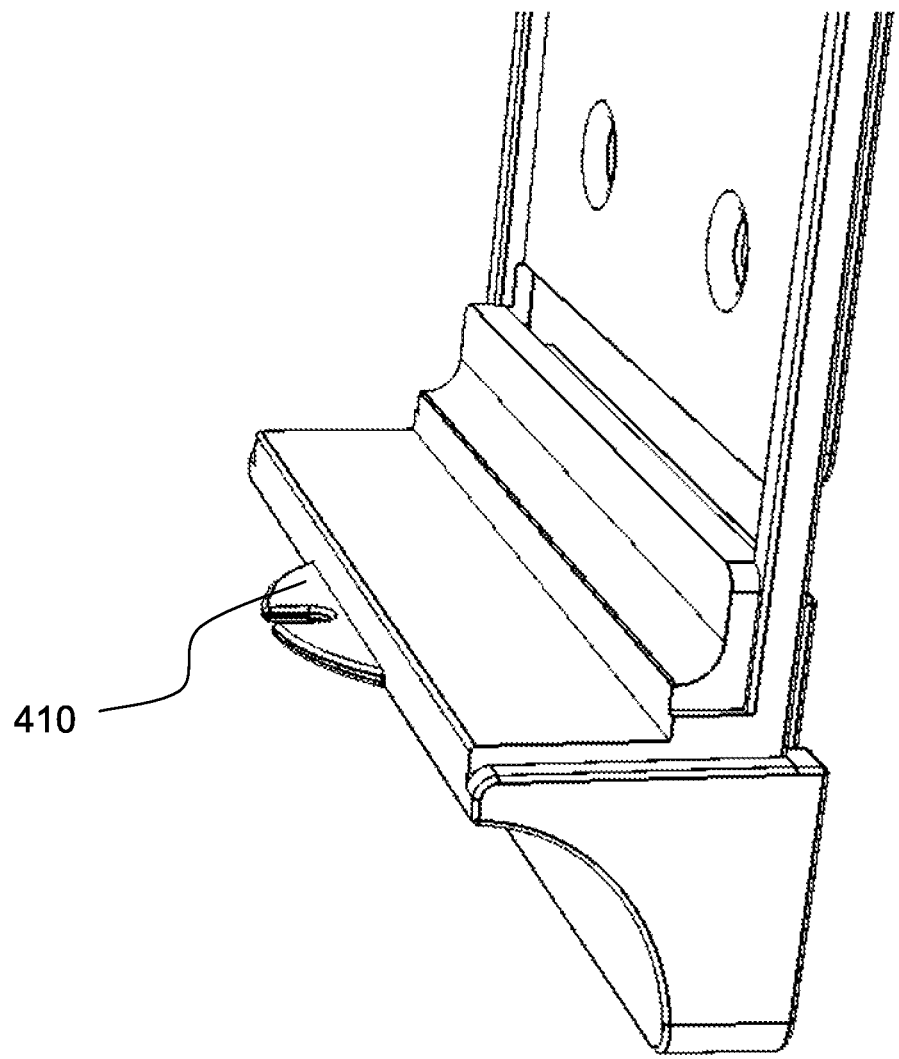

As shown particularly in FIG. 12, mounting plate 202 preferably includes flanges 214 along the side edges of the mounting plate 202. Flanges 214 are adapted to engage lips 216 of main body 204 in a sliding manner. Accordingly, once mounting plate 202 is mounted onto a wall surface, main body 204 may be slid downwardly onto mounting plate 202 until properly seated. Once slid onto mounting plate 202, main body 204 may be fastened to mounting plate 202 more securely via through hole 216 provided in the lower support 212 of mounting plate 202 and fastening hole 218 provided in the bottom of the main body 202.

Advertising compartment 206 will now be described in greater detail. Advertising compartment 206 includes a front facing window for displaying an advertisement. Advertising compartment 206 preferably comprises a main frame 220 and a hinged backing 222. Hinged backing 222 includes hinge bosses 224 that rotatably engage hinge holes 226 provided at the bottom of side edges of the main frame 220. In this manner, hinged backing 222 may rotate clockwise along an axis formed by the hinge bosses 224 to provide access to the advertising window. Main frame 220 also includes a mounting portion 228 that slidably engages a recess 230 in the lower front surface of main body 204. Mounting portion 228 also includes two slotted flanges 232 that are adapted to align with mounting holes 234 in the lower surface of main body 204. A third mounting hole 236 is provided in the bottom surface of main body 204 so that a slotted flange 238 provided on the top edge of hinged backing 222 so that the hinged backing 222 may be secured in the closed position to prevent tampering or vandalism with regard to an advertisement placed into the device 200.

FIGS. 19-24 illustrate a fourth embodiment of the present invention. Device 400 is similar to the device 200 described in connection with FIGS. 10-18, except that the advertisement window is integrated into the main body. As illustrated device 400 includes a mounting plate 402 and a main body 404. Mounting plate 402 and main body 404 include a flange and lip arrangement along the side edges of the device 400 so that main body 404 main by slid downwardly onto mounting plate 402. As illustrated, main body 402 includes an advertising opening 406, and the advertising components 408 may be inserted therein. Mounting plate 402 includes a mounting flange 410 that is adapted to align with hole 412 (see FIG. 22) in main body 404 so that main body 404 may be secured to mounting plate 402. Although not illustrated, one of ordinary skill in the art will readily appreciate that main body 404 may be provided with a recess in the bottom front edge to receive an additional advertising compartment, similar to that described in FIGS. 10-18. Such an arrangement would provide an opportunity for two advertisements windows in a single device.

Figure 25:
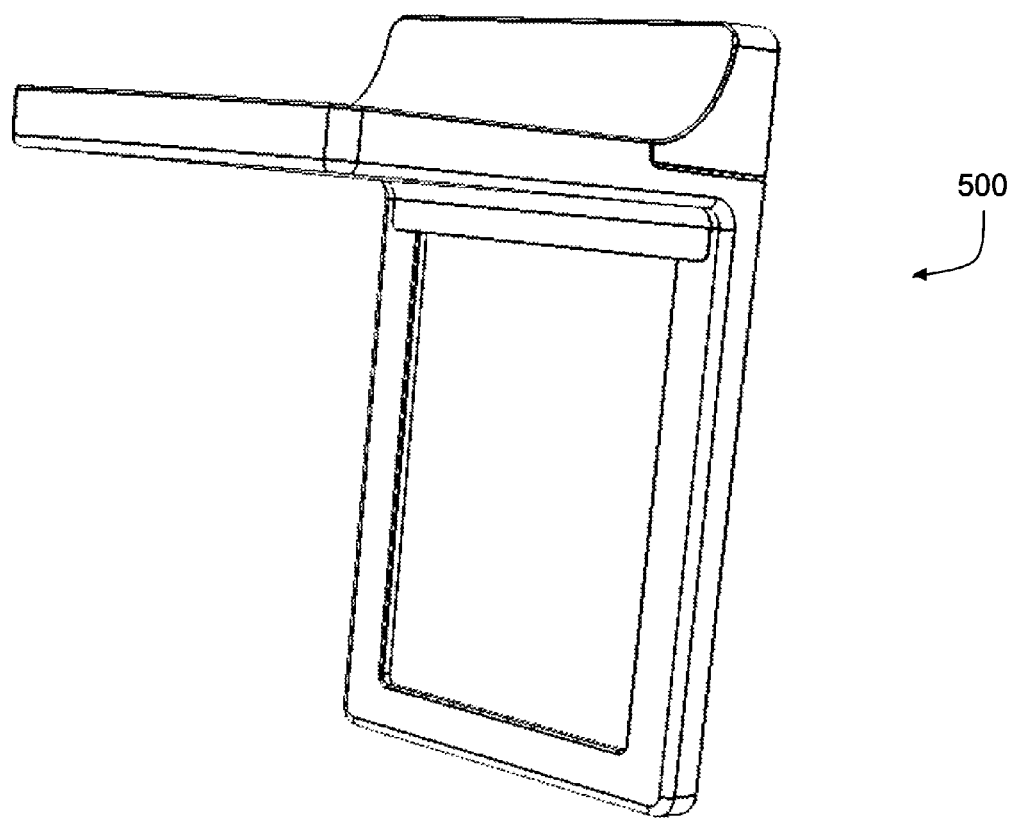
FIG. 25 depicts a device according to a fifth exemplary embodiment of the present invention.
Figure 26:
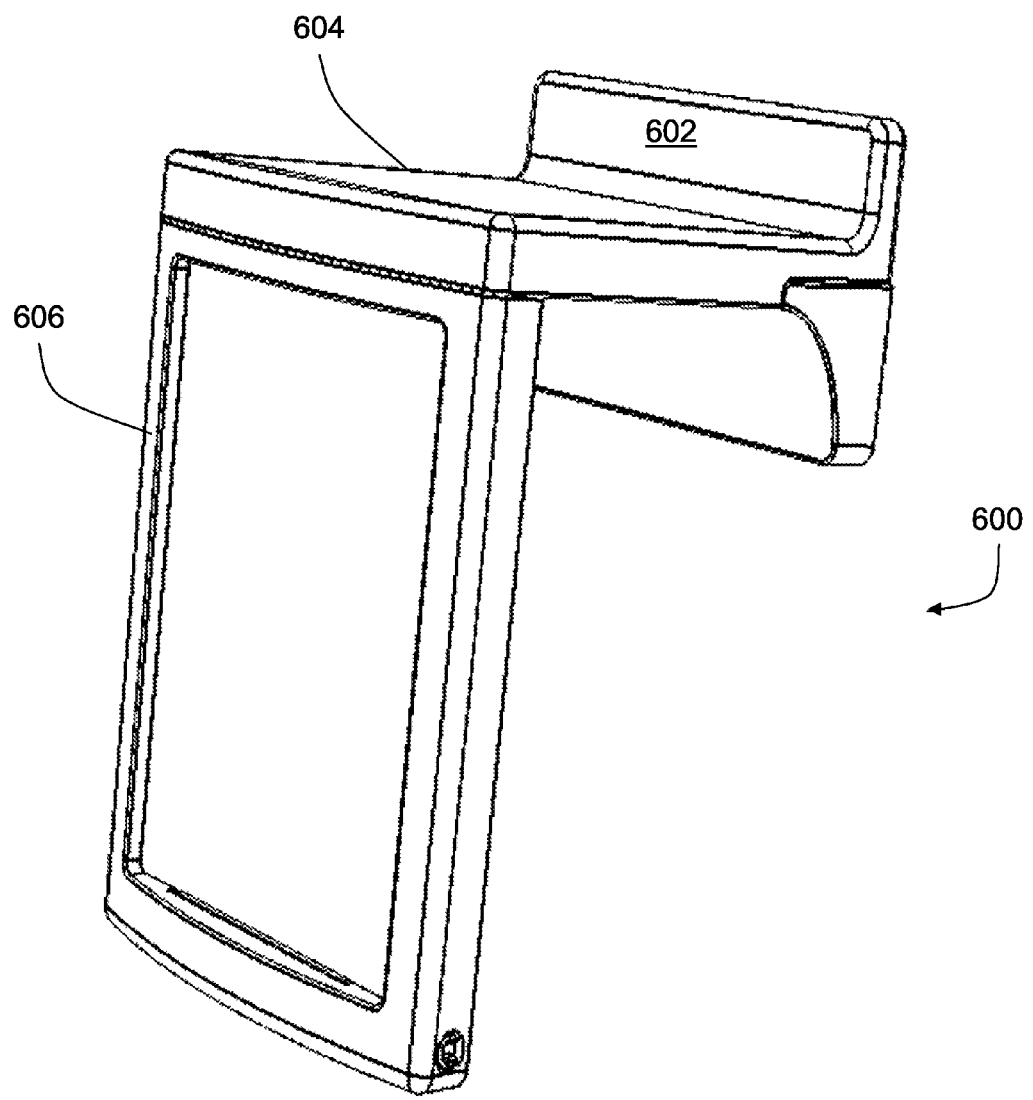
FIGS. 26-31 depict a device according to a sixth exemplary embodiment of the present invention.
Figure 27:
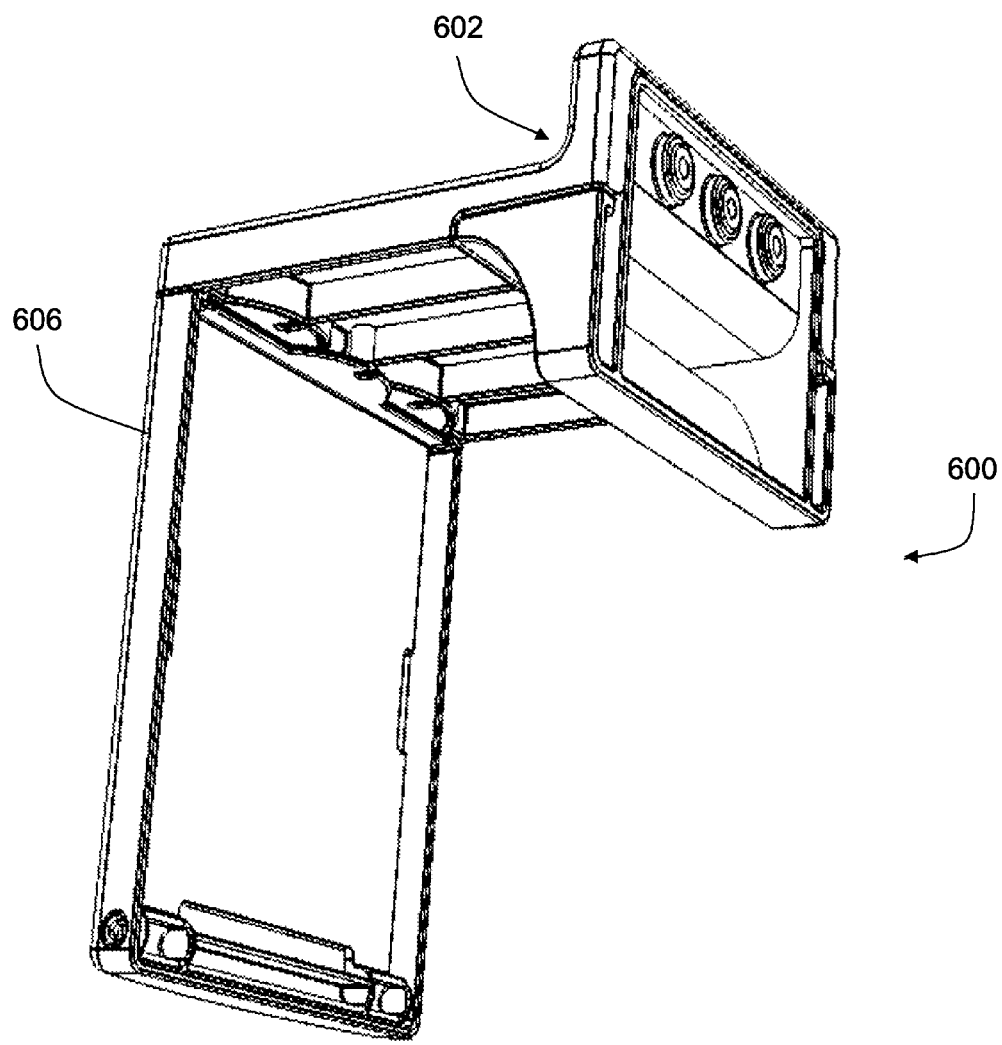
Figure 28:
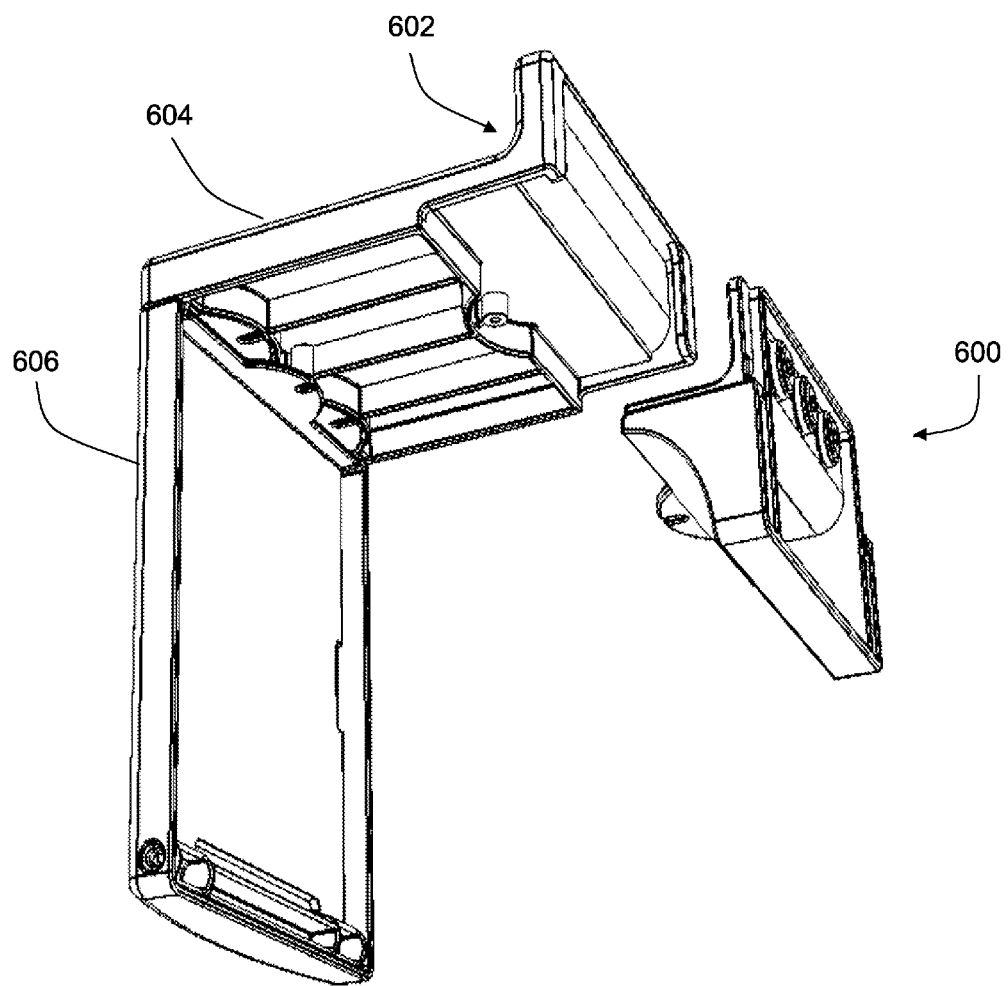
Figure 29:
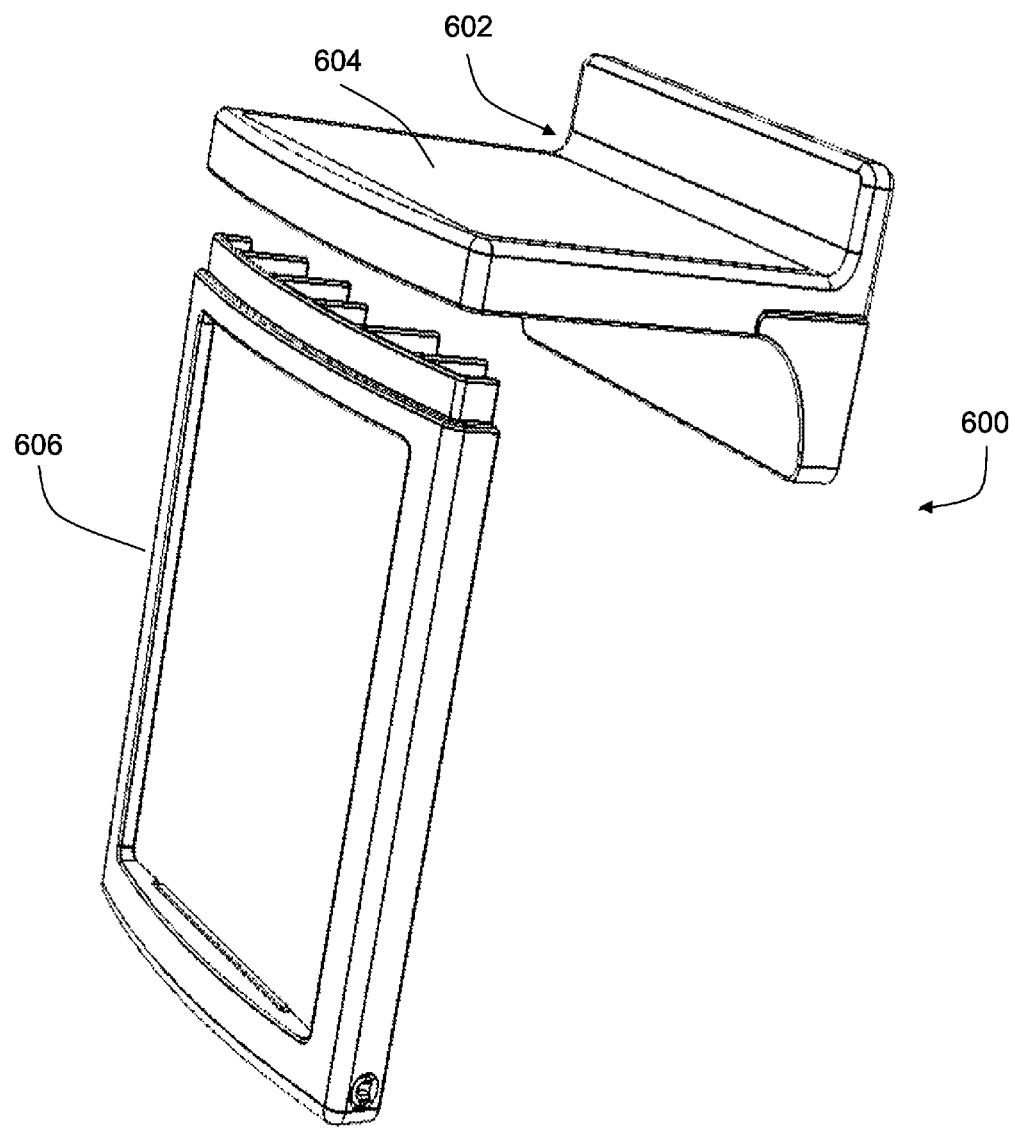
Figure 30:
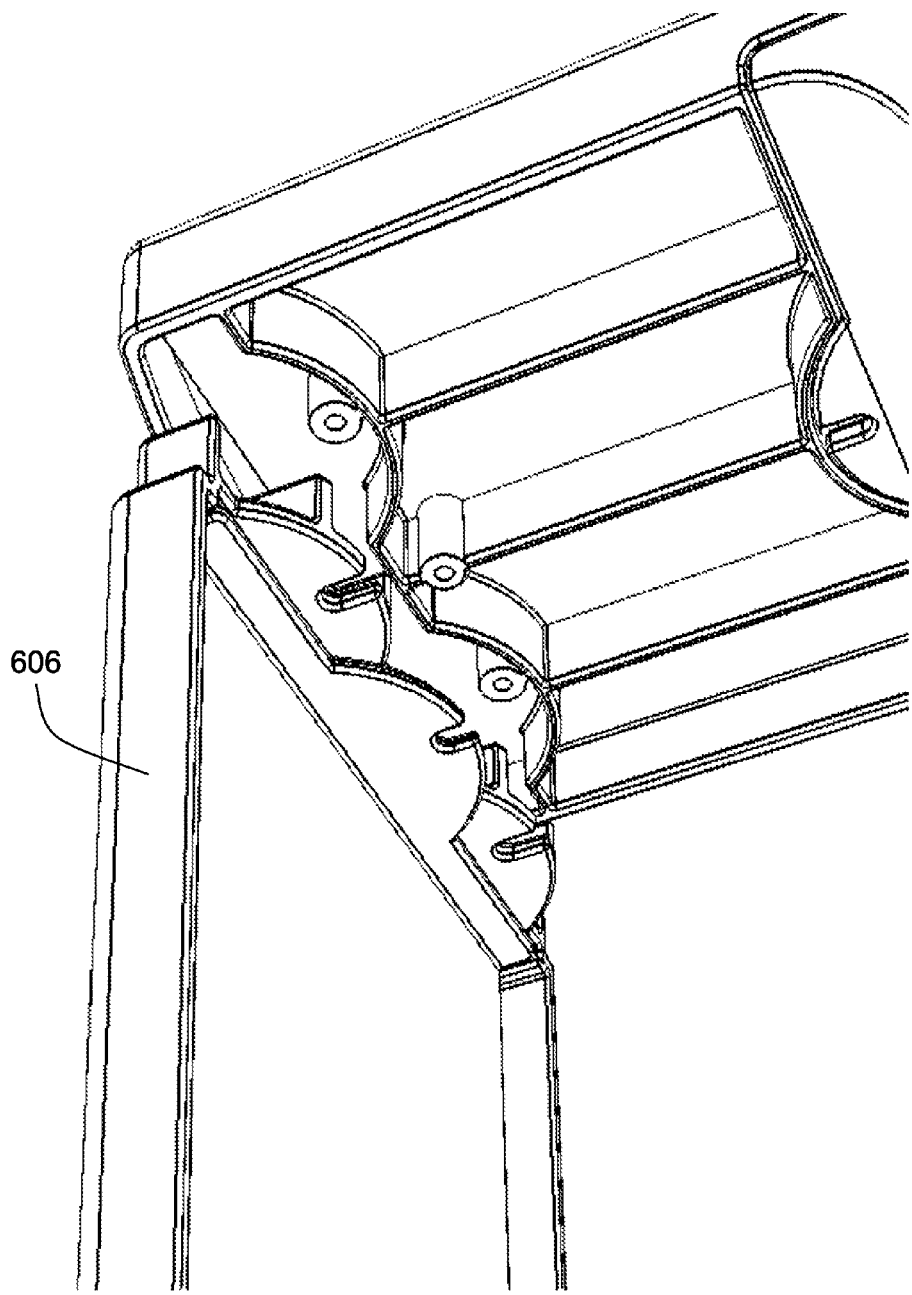
Figure 31:
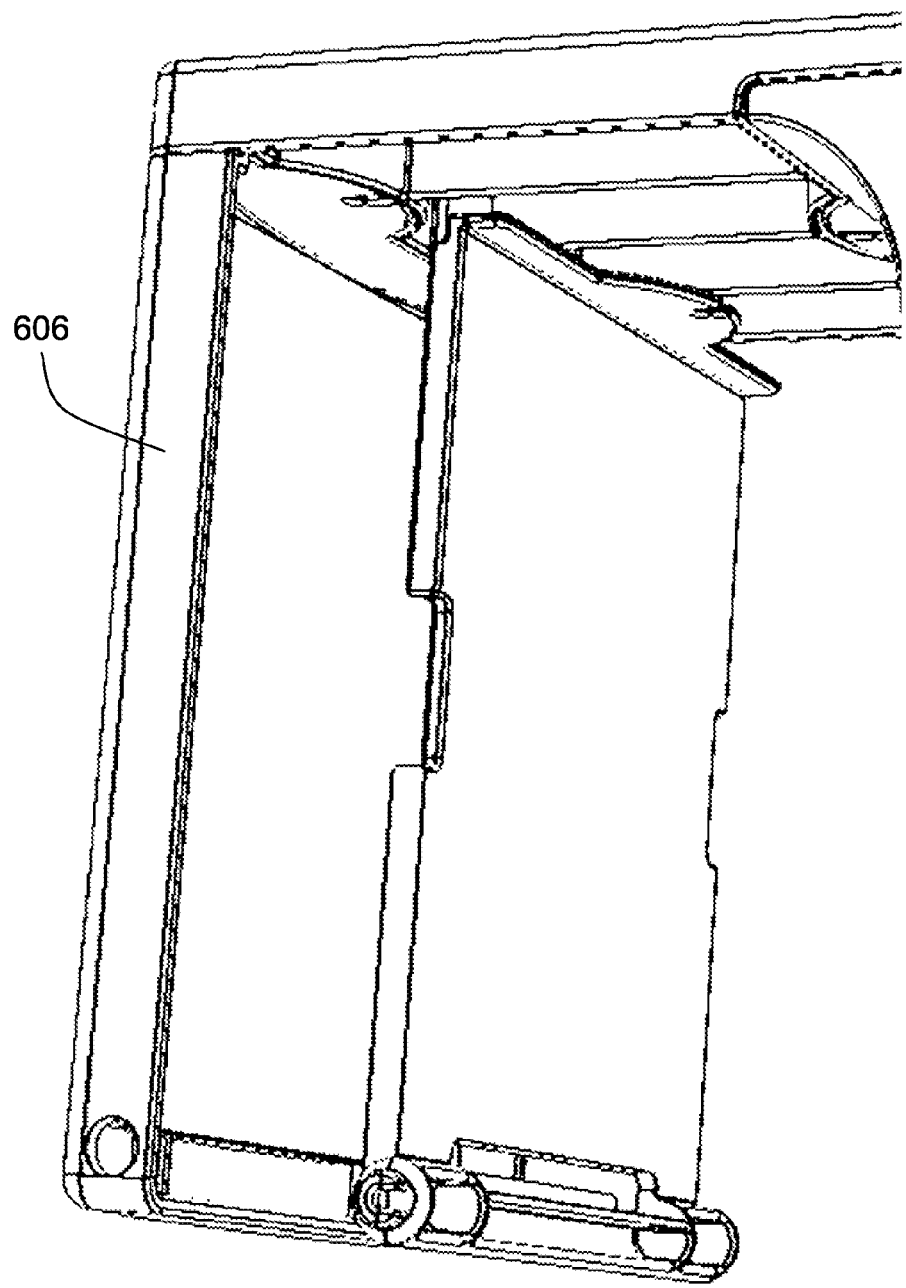
Figure 32:
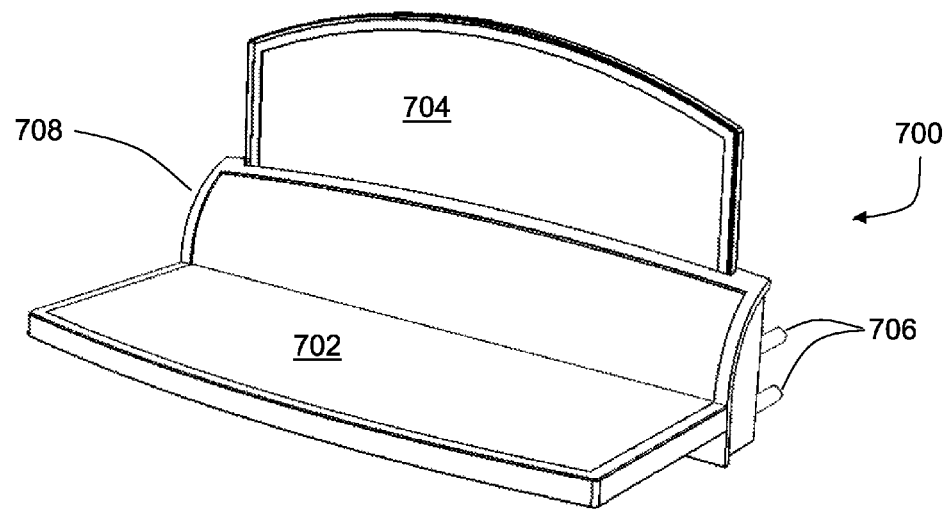
FIGS. 32-36 depict a device according to a seventh exemplary embodiment of the present invention.
Figure 33:
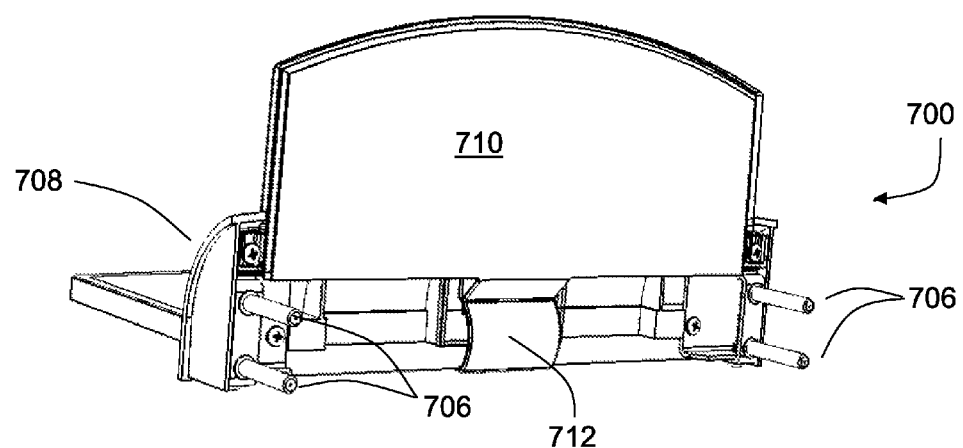
Figure 34:
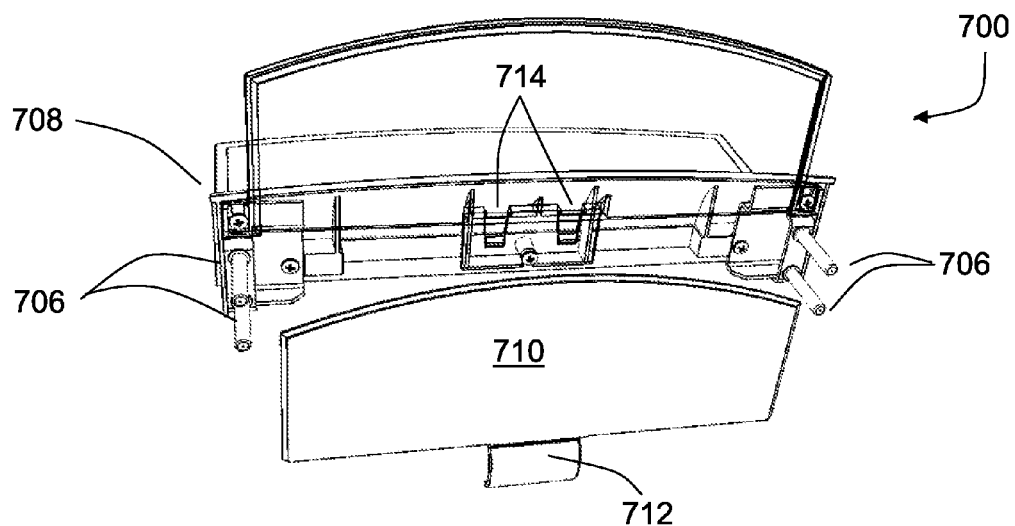
Figure 35:
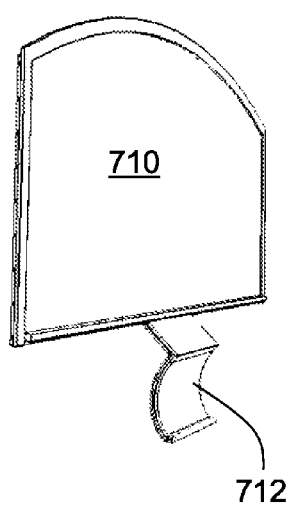
Figure 36:
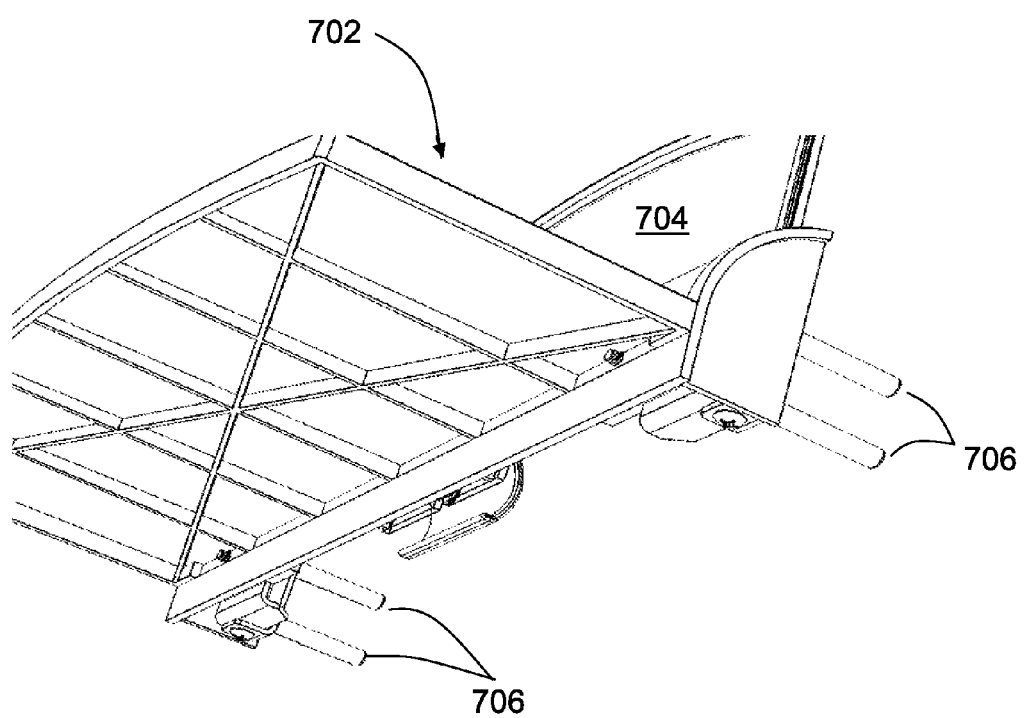
Figure 37:
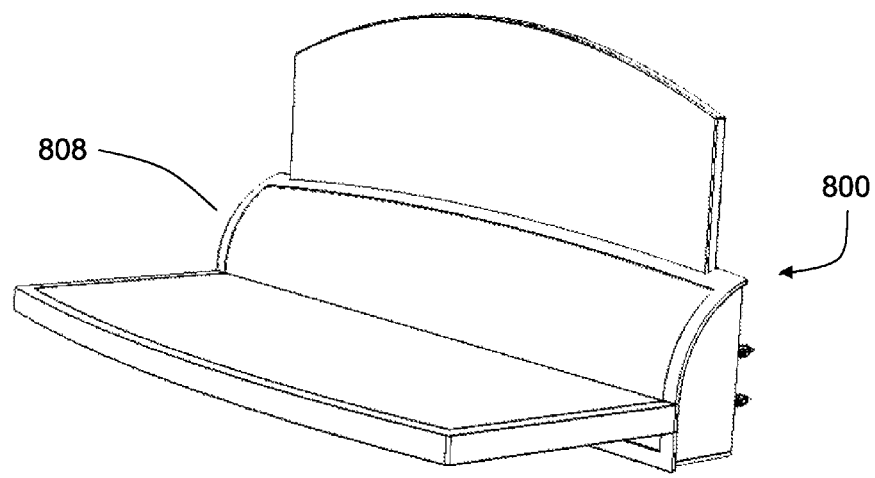
FIGS. 37-40 depict a device according to an eighth exemplary embodiment of the present invention.

FIG. 25 illustrates a fifth embodiment of the present invention. The device 500 is substantially similar to the device 400 illustrated in FIGS. 19-24, except that the advertising compartment is oriented below the shelf of the main body. The fourth and fifth embodiments advantageously orient the advertising portion against the wall surface upon which the device is mounted, in order to minimize the opportunity for vandalism or tampering.

FIGS. 26-31 illustrate a sixth embodiment of the present invention. Device 600 is similar in most respects to the embodiment described above with respect to FIGS. 10-18, except that the back surface 602 of the main body 604 is truncated. Advertising compartment 606 is shown with a hinge on the bottom edge of the compartment. If course, one of ordinary skill in the art will readily appreciate that the hinge may be formed along any of the four edges.

FIGS. 32-36 illustrate a seventh embodiment of the present invention. Device 700 comprises a wide shelf 702 adapted to hold several beverages at once. Device 700 includes a large advertisement window 704. Device 700 preferably includes four mounting pegs 706 for mounting device 700 to a wall surface, while keeping the main body 708 of device 700 separated from the wall surface. Device 700 includes a window backing 710 which preferably slidably engages with main body 708. Window backing 710 includes a flexible latch 712 that engages recesses 714 when the window backing 710 is fully slid onto main body 708. Flexible latch 712 is accessible while the device is mounted to a wall surface due to the length of mounting pegs 706. Accordingly, window backing 710 may be removed via manipulation of the flexible latch 712 while the device remains mounted. Flexible latch is not visible from the front side of the device when the device 700 is mounted to a wall surface, which minimizes opportunities for vandalism and tampering.

Figure 38:
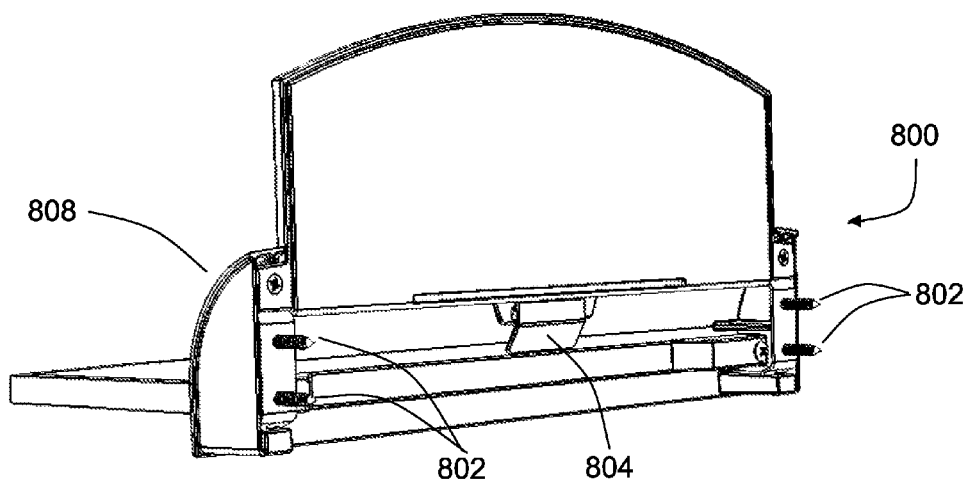
Figure 39:
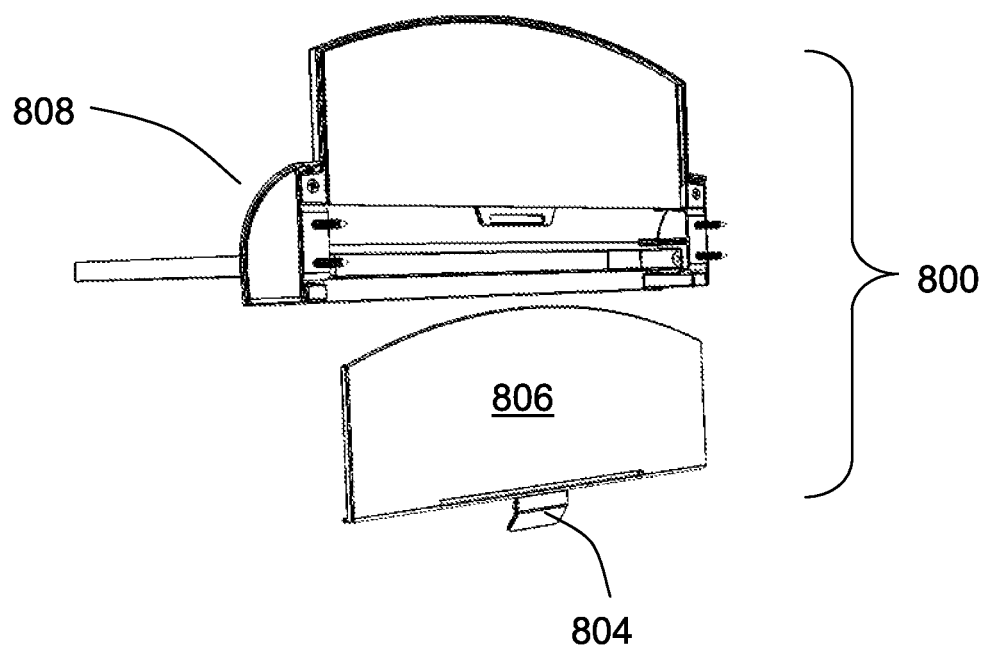
Figure 40:
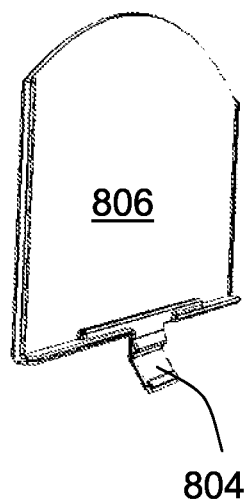

FIGS. 37-40 illustrate an eighth embodiment of the present invention. Device 800 is similar to the previous embodiment, except that device 800 may be mounted flush to a wall surface. FIG. 38 illustrates fasteners 802 extending from the rear surface of device 800. As illustrated a flexible latch 804 is provided such that window backing 806 may be securely slid onto or removed from main body 808. Flexible latch 804 is preferably obscured from view when the window backing 806 is installed. Main body 808 preferably provides an opening at a bottom of the main body to provide access to the flexible latch 804.

Figure 41:
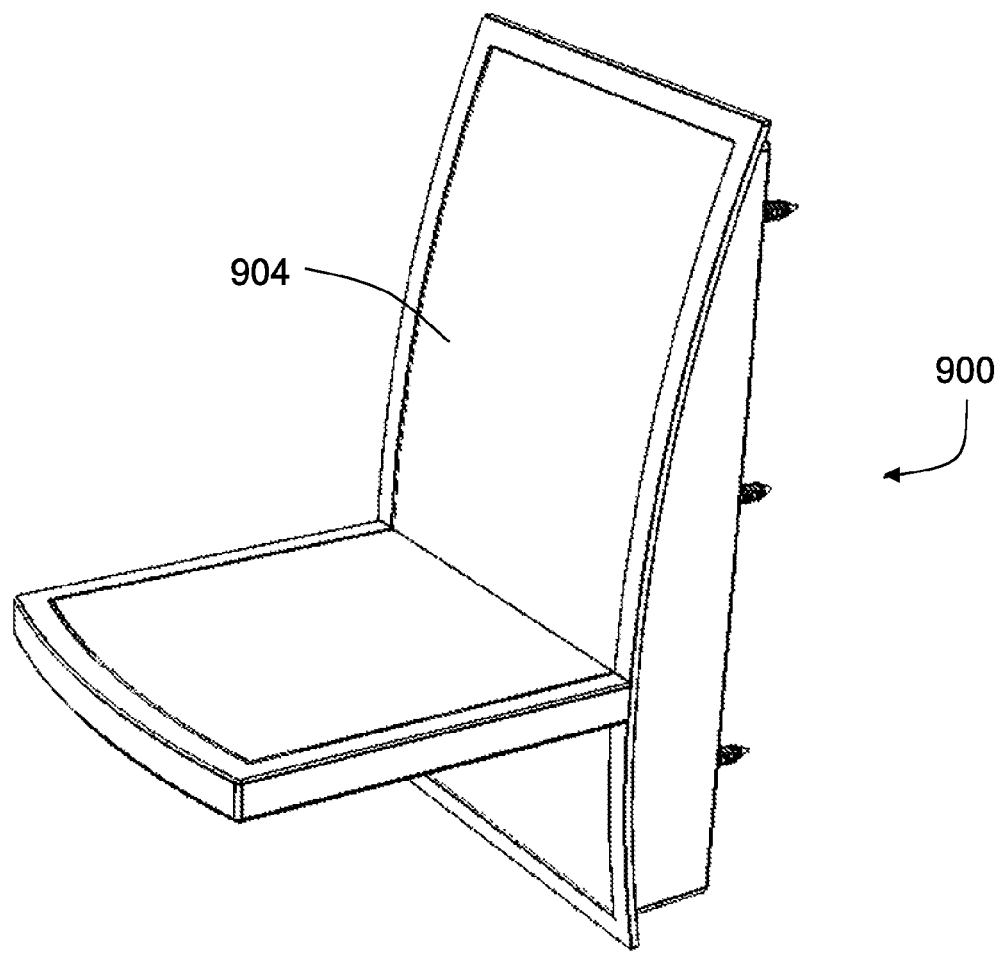
FIGS. 41-43 depict a device according to a ninth exemplary embodiment of the present invention.
Figure 42:
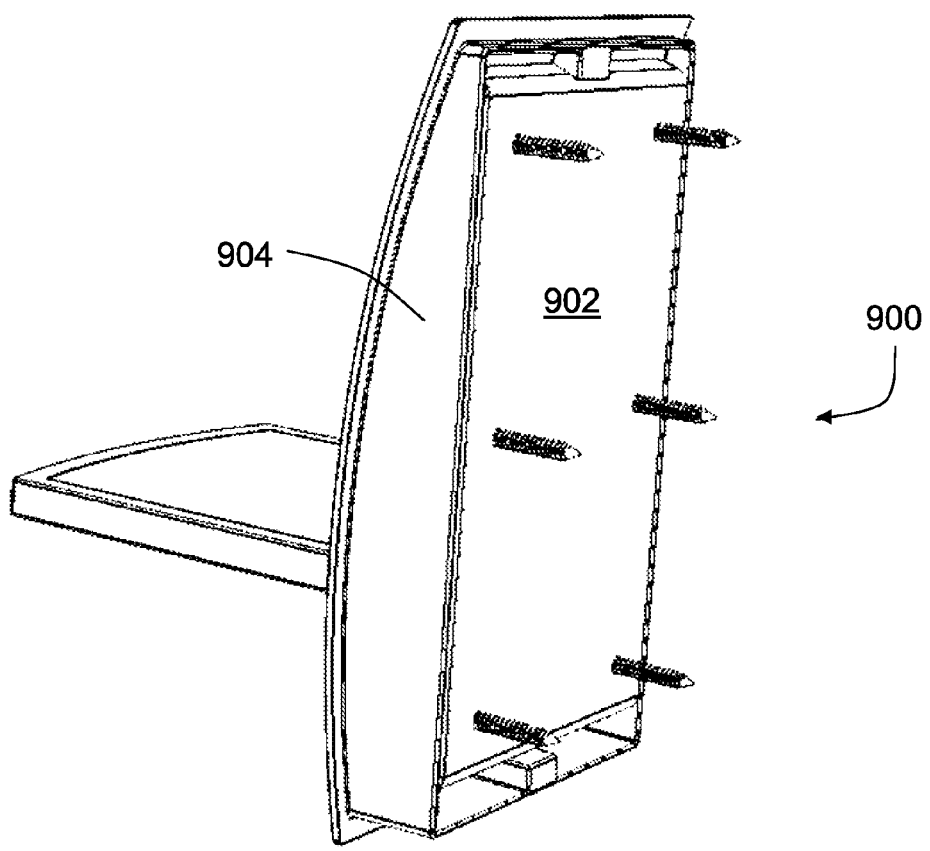
Figure 43:
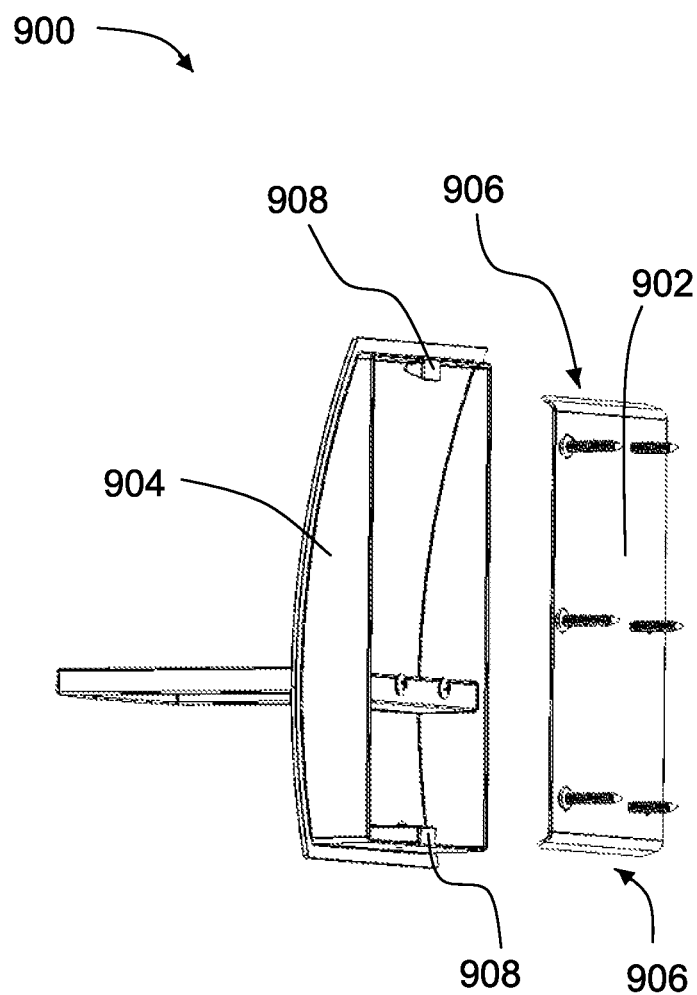
Figure 44:
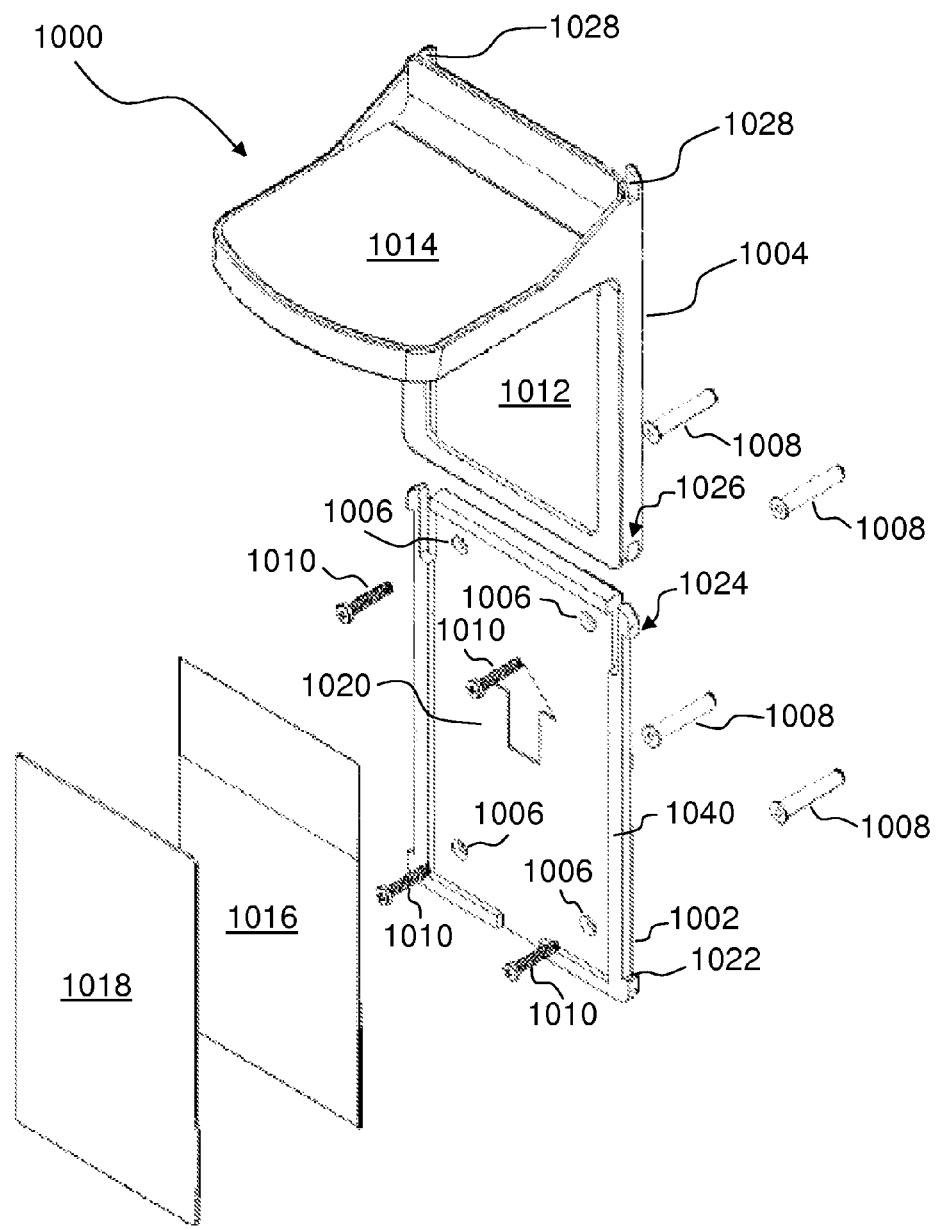
FIG. 44 is an isometric view of a reversible beverage holder advertisement display apparatus according to an exemplary embodiment of the present invention.

FIGS. 41-43 illustrate a ninth embodiment of the present invention. Device 900 includes a mounting plate 902 and a main body 904. Mounting plate 902 may be fastened to a wall surface in any suitable manner, including via threaded fasteners, as shown. Mounting plate 902 includes flanges 906. Flanges 906 engage with bosses 908 of main body 904 such that main body 904 snaps onto mounting plate 902. Any suitable manner of advertising display may be provided on the large front surface of the main body 904, including advertising compartments or advertising printed directly onto the surface.

FIGS. 44-49 illustrate a tenth embodiment of the present invention. Device 1000 includes a wall bracket 1002 and a reversible main body 1004. Wall bracket 1002 preferably includes fastening means such as mount holes 1006 so that the wall bracket can be securely fastened to a wall surface. Wall bracket 1002 can be fastened to a wall surface by conventional wall anchor sleeves 1008 and wall anchor bolts 1010 or by any other suitable means including adhesive, hook and loop fasteners, or any other suitable temporary or permanent fastening method. Main body 1004 preferably comprises an advertisement window portion 1012 and shelf portion 1014. Once wall bracket 1002 is fastened to a wall surface, advertisement 1016 and window 1018 are preferably inserted into a recessed area 1020 of wall bracket 1002, and then reversible main unit 1004 is mounted onto the wall bracket 1002 such that advertisement 1016 is aligned with and visible through the advertisement window portion 1012.

Figure 45:
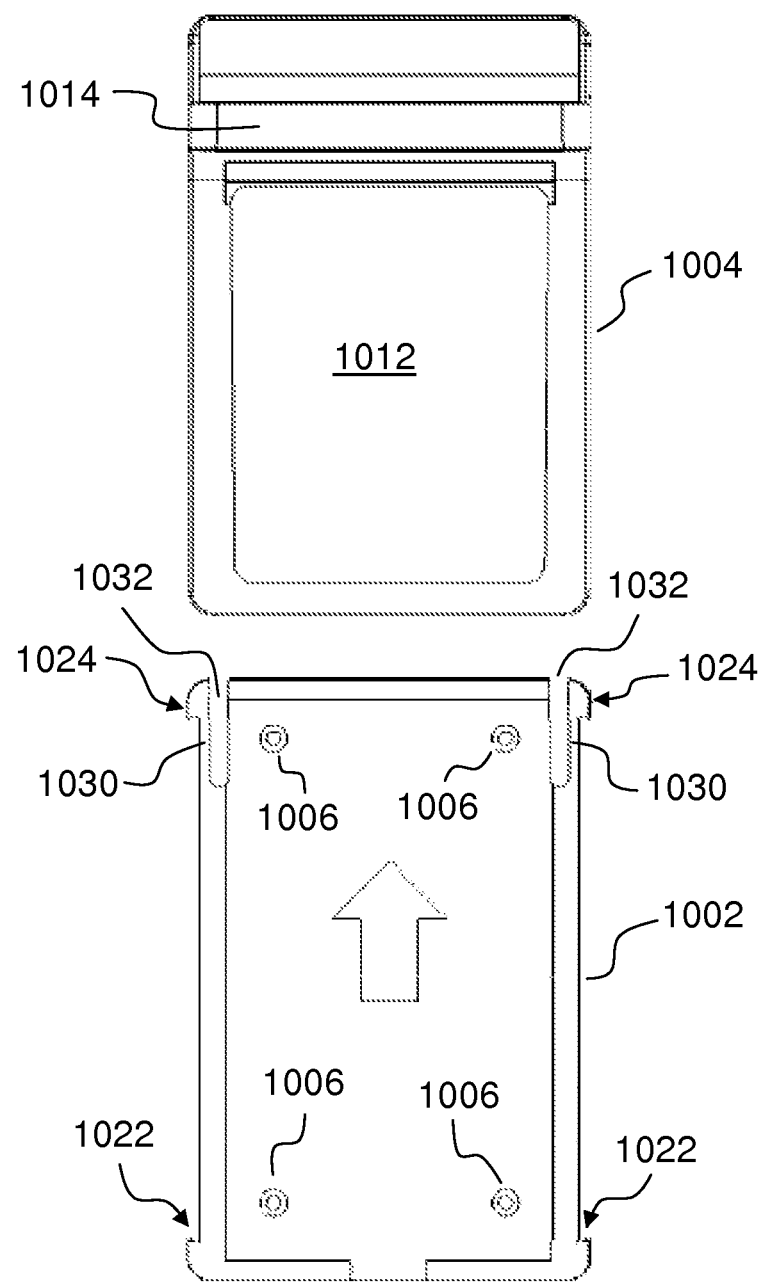
FIG. 45 is a front view of the reversible beverage holder of FIG. 44.
Figure 46:
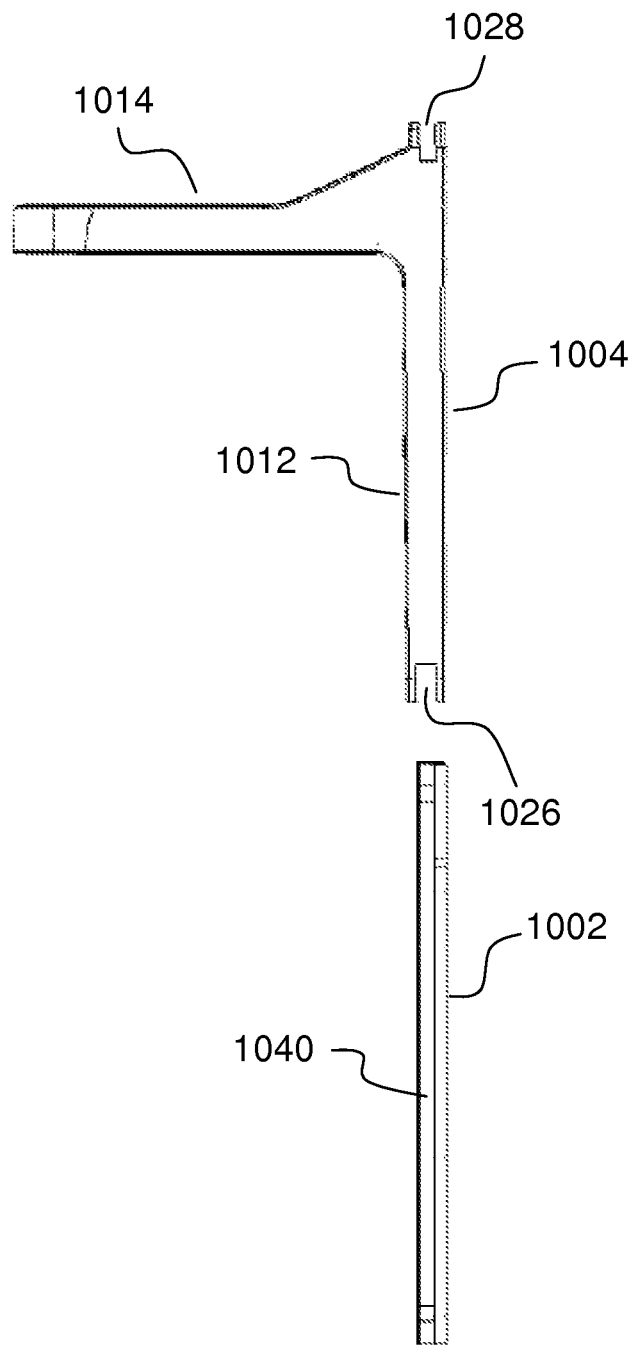
FIG. 46 is a side view of the reversible beverage holder of FIG. 44.
Figure 47:
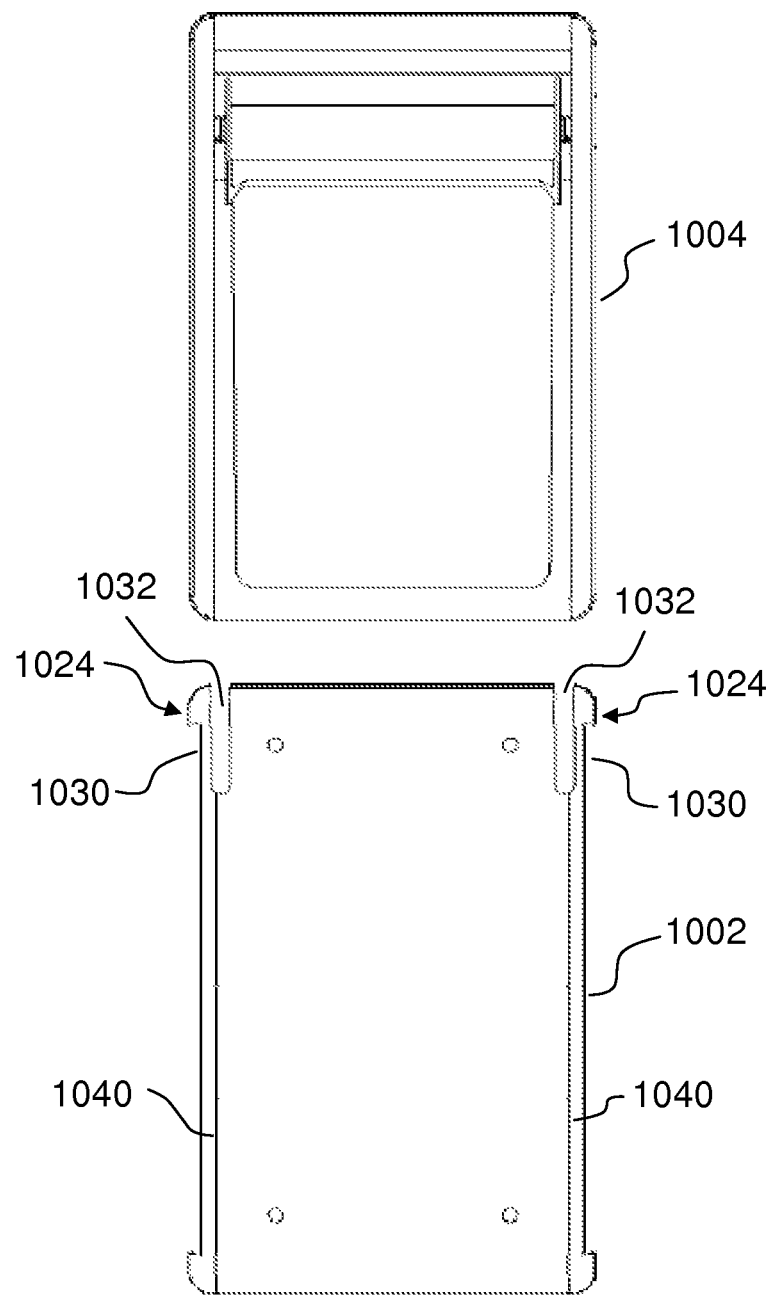
FIG. 47 is a rear view of the reversible beverage holder of FIG. 44.

As best illustrated in FIG. 45, wall bracket 1002 includes mechanical features to permit easy mounting of main unit 1004 onto the wall bracket 1002. Near the bottom edge of wall bracket 1002 are stop surfaces 1022. Near the top edge of wall bracket 1002 are release tabs 1024. As will be appreciated, when main unit 1004 is mounted onto wall bracket 1002, release tabs 1024 flex inwardly to permit main unit 1004 to slide lengthwise onto wall bracket 1002. Once main unit 1004 is fully seated onto wall bracket 1002 stops 1026 of main unit 1004 (shown in FIG. 44) engage with stop surfaces 1022 of the wall bracket 1002. In addition, once release tabs 1024 clear recesses 1028 (best shown in FIG. 44), they snap back to their unflexed positions, thereby preventing main unit 1004 from being removed from wall bracket 1002. As one of ordinary skill in the art will appreciate, pressing the release tabs inwardly will release the main unit 1004 and permit the reversible main unit 1004 to be slid upwardly to remove the main unit 1004 from the wall bracket 1002. Thus, if a static advertisement is provided, the advertisement may be accessed and changed.

Main unit 1004 is preferably made in a reversible manner such that it may by installed in a first orientation with the shelf unit 1014 at the top of the main unit 1004, or alternately in the opposite direction such that shelf unit 1014 is located at the bottom of main unit 1004 (not shown). In addition, in order to facilitate the reversible nature of main unit 1004, an anti-slip material, such as a thin rubber sheet, is preferably applied to the top and bottom surface of shelf unit 1014, to accommodate both orientations of main unit 1004.

The releasable tabs 1024 of wall bracket 1002 are depicted as long thin arms 1030 adjacent to slots 1032 which provide a space in which releasable tabs 1024 can flex inwardly. The length and shape of arms 1030 will naturally depend on the particular material used to form wall bracket 1002. Moreover, alternate embodiments of the flexible release tab structure can readily be envisioned. Any suitable arrangement which will deflect to permit main unit 1004 to slide over wall bracket 1002 and then snap into place once main unit 1004 is fully seated onto wall bracket 1002, are acceptable and considered within the scope of the present invention. As one example, release tabs 1024 need not be integrally formed with wall bracket 1002. Such release tabs may be separate mechanical structures connected to wall bracket 1002 by springs or other flexible means.

Figure 48:
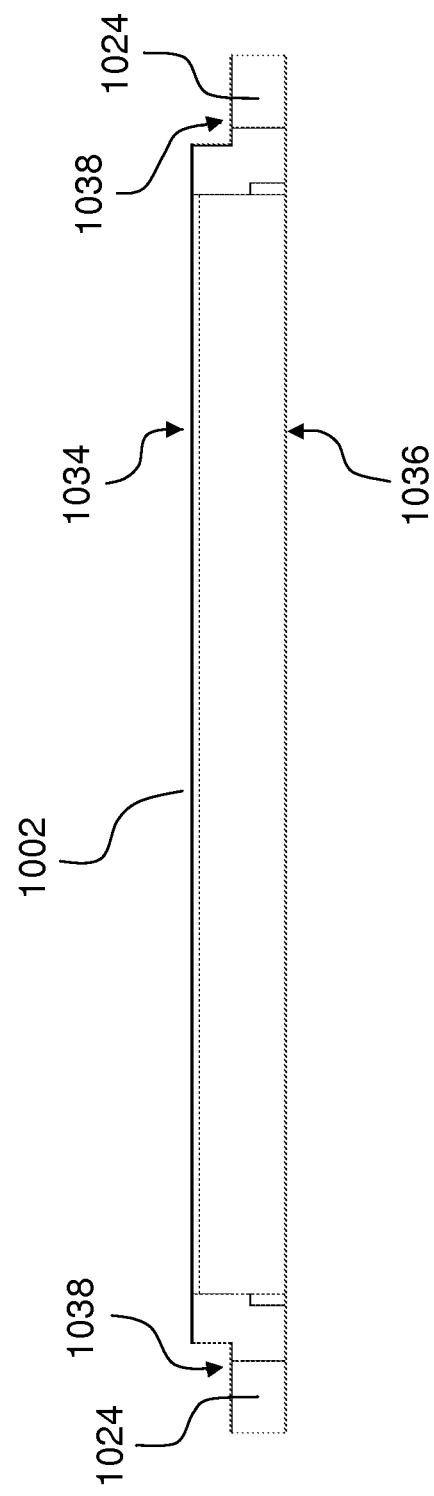
FIG. 48 is a top view of a wall bracket for use with the reversible beverage holder depicted in FIG. 44.
Figure 49:
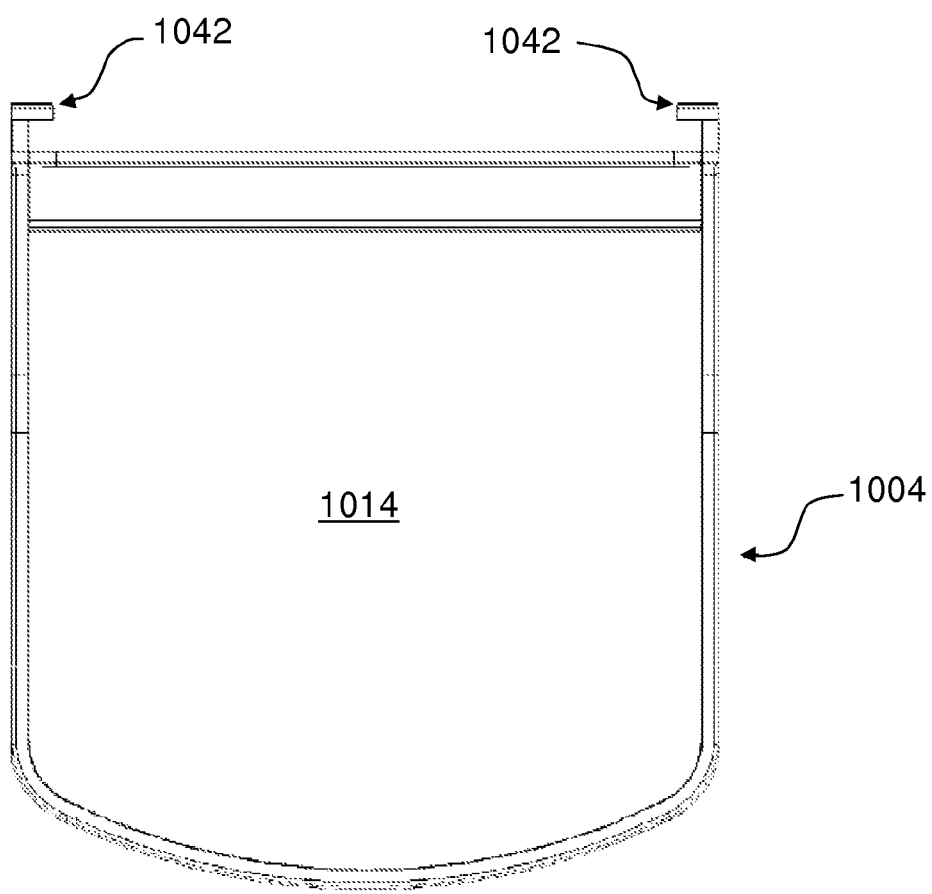
FIG. 49 is a top view of the reversible beverage holder depicted in FIG. 44.

FIG. 48 illustrates a top view of wall bracket 1002. The wall bracket has a wall facing side 1034 and outwardly facing side 1036. Spaces 1038 are provided behind release tabs 1024 of wall bracket 1002. Spaces 1038 provide room for rails 1042 of main unit 1004, best illustrated in FIG. 49, to mate with release tabs 1024 and flanges 1040 of wall bracket 1002.

While the invention herein disclosed has been described by means of specific embodiments and applications thereof, numerous modifications and variations can be made thereto by those skilled in the art without departing from the scope of the invention.

What is claimed is:

1. A reversible horizontal platform and advertising display apparatus comprising:
    a wall bracket mountable to a substantially vertical surface, the wall bracket having a top edge and a bottom edge with an outwardly facing recess adapted to receive an advertisement in an advertising window of a reversible main body;
    wherein the wall bracket further includes flanges spaced from the vertical surface along side edges of the wall bracket, the flanges including a stop surface near the bottom edge, and a release tab near the top edge; and
    the reversible main body having a substantially horizontal platform cantilevered to the main body and extending outwardly from the vertical surface;
    wherein the reversible main body is slidably mounted onto the wall bracket, the reversible main body having rails adapted to slidably engage the flanges of the wall bracket, the rails forming recesses near top and bottom edges of the main body, wherein the recess near the bottom edge provides a stop feature that engages the stop surface of the wall bracket and the release tab is adapted to flex inwardly to permit the main body to be slidably mounted onto the wall bracket, the release tab unflexing when the top recess of the reversible main body clears the release tab.

2. The reversible horizontal platform and advertising display apparatus of claim 1, wherein the horizontal platform is provided with an anti-slip material on top and bottom surfaces thereof.

3. The reversible horizontal platform and advertising display apparatus of claim 1, wherein the main body is provided with the advertising window substantially aligned with the outwardly facing recess of the wall bracket when the reversible main body is mounted onto the wall bracket.

4. The reversible horizontal platform and advertising display apparatus of claim 1, wherein the wall bracket further comprises mounting holes for permanently attaching the wall bracket to the vertical surface.

5. The reversible horizontal platform and advertising display apparatus of claim 1, wherein the horizontal platform is provided adjacent the advertising window of the main body, such that in a first orientation the horizontal platform is above the advertising window, and in a second orientation the horizontal platform is below the advertising window.

6. The reversible horizontal platform and advertising display apparatus of claim 1, wherein the horizontal platform is braced to the main body to provide sufficient weight bearing capacity to hold substantially more than a beverage glass full of liquid.

7. The reversible horizontal platform and advertising display apparatus of claim 1, wherein the release tabs are integrally formed with the wall bracket and include flexible arms adjacent to slots.

8. The reversible horizontal platform and advertising display apparatus of claim 7, wherein the release tabs are integrally formed with the flanges of the wall bracket.

9. The reversible horizontal platform and advertising display apparatus of claim 1, wherein the advertisement comprises an electronic display.

10. The reversible horizontal platform and advertising display apparatus of claim 1, further comprising a power source, a wireless networking unit, and at least one sensor selected from the group consisting of a motion detector, a photo detector, an orientation sensor and a near field communication (NFC) sensor.

\* \* \* \* \*